(12) United States Patent
Kamikawa et al.

(10) Patent No.: US 8,025,579 B2
(45) Date of Patent: Sep. 27, 2011

(54) WHEEL SUPPORT APPARATUS

(75) Inventors: Tsuyoshi Kamikawa, Nara (JP); Satoru Murao, Sakai (JP)

(73) Assignee: JTEKT Corporation, Osaka-Shi, Osaka (JP)

( * ) Notice: Subject to any disclaimer, the term of this patent is extended or adjusted under 35 U.S.C. 154(b) by 384 days.

(21) Appl. No.: 12/285,361

(22) Filed: Oct. 2, 2008

(65) Prior Publication Data
US 2009/0108668 A1 Apr. 30, 2009

(30) Foreign Application Priority Data

Oct. 3, 2007 (JP) ................. 2007-259693
Oct. 3, 2007 (JP) ................. 2007-259694
Mar. 28, 2008 (JP) ................. 2008-086743

(51) Int. Cl.
*F16C 19/18* (2006.01)
(52) U.S. Cl. .................. 464/178; 403/97
(58) Field of Classification Search ........... 464/178, 464/906, 182; 403/96, 97, 359.1, 359.6; 384/544, 589
See application file for complete search history.

(56) References Cited

U.S. PATENT DOCUMENTS

| 4,440,256 A | * | 4/1984 | Palmer ................. 384/544 X |
| 4,460,058 A | | 7/1984 | Welschof et al. |
| 4,893,960 A | | 1/1990 | Beier et al. |
| 6,669,570 B2 | | 12/2003 | Krude |
| 7,857,520 B2 | * | 12/2010 | Langer et al. ............ 384/544 |
| 2008/0193071 A1 | * | 8/2008 | Langer et al. ............ 384/544 |

FOREIGN PATENT DOCUMENTS

| DE | 32 19 747 A1 | 12/1983 |
| DE | 36 36 243 A1 | 5/1988 |
| DE | 3636243 A1 | 1/1990 |
| DE | 101 27 458 A1 | 1/2003 |
| JP | 57-178903 | 11/1982 |
| JP | 63-184501 | 7/1988 |
| JP | 2002-114004 | 4/2002 |
| WO | WO2006/092119 | 9/2006 |
| WO | WO2006/105748 | 10/2006 |
| WO | WO2006/111146 | 10/2006 |

(Continued)

OTHER PUBLICATIONS

European Search Report dated Feb. 19, 2009.

(Continued)

*Primary Examiner* — Gregory Binda
(74) *Attorney, Agent, or Firm* — McGinn IP Law Group, PLLC

(57) ABSTRACT

A hub shaft of a hub wheel for the mounting of a wheel thereon and an outer ring of a constant velocity joint are connected together. A first side surface spline is formed on an end surface of the hub shaft, and a second side surface spline is formed on an end surface of a side wall portion of the outer ring abutting against the end surface of the hub shaft, and the first and second side surface splines are meshed with each other to connect the hub shaft of the hub wheel and the outer ring of the constant velocity joint together in a torque-transmitting manner, each of the two side surface splines having a number of spline teeth. At least one of the spline teeth of at least one of the two side surface splines is removed to form a removal portion which forms a drain passage.

4 Claims, 14 Drawing Sheets

FOREIGN PATENT DOCUMENTS

| WO | WO2006/114083 | 11/2006 |
| WO | WO 2006/114083 A | 11/2006 |
| WO | WO2007/014553 | 2/2007 |
| WO | WO2007/140762 | 12/2007 |
| WO | WO2008/003292 | 1/2008 |
| WO | WO2008/006339 | 1/2008 |

OTHER PUBLICATIONS

European Search Report Dated Mar. 31, 2009.

* cited by examiner

WHEEL SUPPORT APPARATUS

BACKGROUND OF THE INVENTION

This invention relates to a wheel support apparatus in which a hub shaft of a hub wheel for the mounting of a wheel thereon and an outer ring of a constant velocity joint are connected together in a torque-transmitting manner.

There is known one conventional wheel support apparatus of this type in which a hub shaft of a hub wheel and an outer ring of a constant velocity joint are interconnected by an connecting bolt, and also two side surface splines are formed respectively on an end surface of the hub shaft of the hub wheel and an end surface of a side wall portion of the constant velocity joint which abuts against the end surface of the hub shaft, and the hub wheel and the constant velocity joint are connected together in a torque-transmitting manner through the two side surface splines (see, for example, JP-A-63-184501).

When the two side surface splines formed respectively on the end surface of the hub shaft of the hub wheel and the end surface of the side wall portion of the constant velocity joint are meshed with each other, thereby connecting the hub wheel and the constant velocity joint together in a torque-transmitting manner as described above, it is feared that muddy water or the like splashed up by a wheel may accidentally intrude into the interior through a clearance between the two side surface splines meshed with each other, so that rust may develop in the interior.

One conventional wheel support apparatus of the type described is disclosed, for example, in JP-A-2002-114004.

In this wheel support apparatus, a double row angular contact ball bearing 120 comprising an inner ring 121, an outer ring 130 and balls (rolling elements) 141 and 142 is mounted on an outer peripheral surface of a hub shaft 113 of a hub wheel 110 as shown in FIG. 17.

On the other hand, a connecting shaft portion 163 is formed integrally on and extending from an end surface of a side wall portion 161 of an outer ring 160 of a constant velocity joint 150 to which an end portion of a drive shaft 151 is connected. An internal spline 114 is formed on an inner peripheral surface of a bore of the hub shaft 113 of the hub wheel 110, and an external spline 164 for meshing with the internal spline 114 is formed on an outer peripheral surface of the connecting shaft portion 163.

The connecting shaft portion 163 is inserted and fitted into the bore of the hub shaft 113 of the hub wheel 110 while the internal and external splines 114 and 164 are brought into meshing engagement with each other, and then a lock nut 166 is fastened onto an male-threaded portion 165 projecting from a distal end of the connecting shaft portion 163, and by doing so, the hub wheel 110 and the constant velocity joint 150 are connected together in a torque-transmitting manner.

In the wheel support apparatus disclosed in JP-A-2002-114004, for example, during the travel of a vehicle, a torque of the outer ring 160 of the constant velocity joint 150 rotating in the same direction as the direction of rotation of the drive shaft 151 is transmitted to the hub wheel 110 through the internal and external splines 114 and 164 meshing with each other, thereby driving the wheel to rotate it.

At this time, a relative slip (slip including a torsion) sometimes develops between the end surface of the side wall portion 161 of the outer ring 160 of the constant velocity joint 150 and an end surface (that is, an end surface of a caulked portion 117) of the hub shaft 113 of the hub wheel 110, so that an abnormal sound is generated.

In order to prevent the generation of an abnormal sound due to a relative slip between the end surface of the side wall portion 161 of the outer ring 160 of the constant velocity joint 150 and the end surface of the hub shaft 113 of the hub wheel 110, the Applicant of the present invention has proposed a structure as shown in FIG. 18, in which a side surface spline 280 is formed on an end surface of a caulked portion 217 of a hub shaft 213, and a side surface spline 290 is formed on an end surface of a side wall portion 261 of an outer ring 260 of a constant velocity joint 250 abutting against the end surface of the hub shaft 213, and the two side surface splines 280 and 290 are meshed with each other to connect the hub shaft 213 of a hub wheel 210 and the outer ring 260 of the constant velocity joint 250 together in a torque-transmitting manner.

In the case where the side surface splines 280 and 290 are formed respectively on the end surface of the caulked portion 217 of the hub shaft 213 and the end surface of the side wall portion 261 of the outer ring 260 of the constant velocity joint 260 by forging, each bottom land 282, 292 of each of the two side surface splines 280 and 290 is formed into an inclined surface gradually increasing in depth from its radially-inner end to its radially-outer end.

Therefore, the meshing engagement of the two side surface splines 280 and 290 is limited at the radially-inner portions of the bottom lands 282 and 292. As a result, non-contact portions S where the spline teeth of the spline 280 and the spline teeth of the spline 290 will not contact each other develop at the radially-outer end portions of the bottom lands 282 and 292 of the two side surface splines 280 and 290. Therefore, it is thought that a contact pressure and a shear stress of tooth flanks of the spline teeth at the mutually-contacting portions of the two side surface splines 280 and 290 increase, so that the durability may be adversely affected.

Another conventional wheel support bearing apparatus of this type is disclosed in JP-A-57-178903.

In this conventional wheel support bearing apparatus, in order to connect a hub wheel 210 and a constant velocity joint 250 together in a torque-transmitting manner as shown in FIG. 19, a side spline (side surface spline) 290 is formed on an end surface of a hub shaft 213 of the hub wheel 210, and a side spline (side surface spline) 280 is formed on an end surface of an end wall portion 261 of the outer ring 260 of the constant velocity joint 250, and the hub wheel 210 and the constant velocity joint 250 are connected together in a torque-transmitting manner through the two side splines 280 and 290 meshing with each other.

In order to interconnect the hub shaft 213 of the hub wheel 210 and the outer ring 260 of the constant velocity joint 250, an internally-thread portion 263 corresponding to an male-threaded portion 273 of an connecting bolt 270 is formed in the end wall portion 261 of the outer ring 260 of the constant velocity joint 250, while a center hole 214 for the passage of a shank 272 of the connecting bolt 270 therethrough is formed through a center portion of the hub shaft 213.

The two side splines 280 and 290 are meshed with each other, and in this condition the shank 272 of the connecting bolt 270 is passed through the center hole 214 of the hub shaft 213 from the outside thereof, and the male-threaded portion 273 on this shank 272 is threaded into the internally-threaded portion 263 of the end wall portion 261 of the outer ring 260 to be fastened thereto, thereby coupling the hub shaft 213 of the hub wheel 210 and the outer ring 260 of the constant velocity joint 250 together.

Each tooth top 283 of the side spline 280 on the end wall portion 261 of the outer ring 260 of the constant velocity joint 250, as well as each bottom land 292 of the side spline 290 on the hub shaft 213, is disposed in a pane (vertical plane) perpendicular to a center axis of the hub shaft 213.

In the condition in which the hub shaft 213 of the hub wheel 210 and the outer ring 260 of the constant velocity joint 250 are connected together by tightening the connecting bolt 270, each tooth top 283 of the side spline 280 contacts the corresponding bottom land 292 of the side spline 290. Also, each bottom land 282 of the side spline 280 of the constant velocity joint 250 and a corresponding tooth top 293 of the side spline 290 of the hub shaft 213 are disposed out of contact with each other, with a clearance S' formed therebetween.

In the wheel support bearing apparatus disclosed in JP-A-57-178903, it is rather difficult to interconnect the hub shaft 213 of the hub wheel 210 and the outer ring 260 of the constant velocity joint 250 in aligned relation to each other (that is, with their center axes coinciding with each other), with the two side splines 280 and 290 meshing with each other, by tightening the connecting bolt 270, and it is thought that the hub shaft 213 of the hub wheel 210 and the outer ring 260 of the constant velocity joint 250 can be brought out of alignment with each other (that is, their center axes become misaligned with each other). This misalignment causes vibration and an abnormal sound.

SUMMARY OF THE INVENTION

With the above problem in view, it is an object of this invention to provide a wheel support apparatus in which muddy water or the like, intruding into the interior through a clearance between two side surface splines formed respectively on an end surface of a hub shaft of a hub wheel and an end surface of a side wall portion of a constant velocity joint and meshing with each other, can be satisfactorily discharged or drained to the exterior under the influence of a centrifugal force.

Another object of this invention is to provide a wheel support apparatus in which the area of non-contact portions of two side surface splines formed respectively on a hub wheel and a constant velocity joint is reduced, and accordingly the area of contact between mating tooth flanks of the two side surface splines is increased, thereby decreasing a contact pressure and a shear stress of the tooth flanks.

Further another object of this invention is to provide a wheel support bearing apparatus in which a hub shaft of a hub wheel and an outer ring of a constant velocity joint can be aligned with each other by meshing engagement of two side splines formed respectively on an end surface of the hub shaft and an end surface of the outer ring of the constant velocity joint.

In order to achieve the above objects, the present invention provides the following arrangements.

A first exemplary arrangement includes a wheel support apparatus including a hub wheel which includes a hub shaft and is to mount a wheel thereon, a first side surface spline being formed on an end surface of the hub shaft, and a constant velocity joint which includes an outer ring connected to the hub shaft in a torque-transmitting manner, a second side surface spline meshed with the first side surface spline being formed on an end surface of a side wall portion of the outer ring abutting against the end surface of the hub shaft. In the exemplary wheel support apparatus each of the first and second side surface splines includes a number of spline teeth, and at least one of the spline teeth of at least one of the first and second side surface splines is removed to form a removal portion which forms a drain passage.

A second exemplary arrangement includes the wheel support apparatus according to the first exemplary arrangement, in which the hub shaft includes a bore and an interconnecting shaft which connects the hub shaft and the outer ring together and is passed through the bore, and the bore is formed into a tapering hole, and has one end of a larger diameter disposed close to the first side surface spline, and is gradually decreasing in diameter from the one end thereof toward the other end thereof.

A third exemplary arrangement includes a wheel support apparatus including a hub wheel which includes a hub shaft and is to mount a wheel thereon, a first side surface spline being formed on an end surface of the hub shaft, and a constant velocity joint which includes an outer ring connected to the hub shaft in a torque-transmitting manner, a second side surface spline meshed with the first side surface spline being formed on an end surface of a side wall portion of the outer ring abutting against the end surface of the hub shaft. In the exemplary wheel support apparatus each of the first and second side surface splines includes a number of spline teeth and bottom lands defined between the spline teeth, and the bottom lands of at least one of the first and second side surface splines defines a circular inner periphery, a circular outer periphery and a base circle lying generally midway between the circular inner and outer peripheries, and each of the bottom lands includes a radially-inner inclined surface which is defined between the circular inner periphery and the base circle and gradually increases in depth from the base circle toward the circular inner periphery and a radially-outer inclined surface which is defined between the circular outer periphery and the base circle and gradually increase in depth from the base circle toward the circular outer periphery, thereby each of the bottom lands is formed into a mountain-like shape in which the base circle is formed as an apex.

A fourth exemplary arrangement includes the wheel support apparatus according to the third exemplary arrangement, in which at least one of the spline teeth of at least one of the first and second side surface splines is removed to form a removal portion which forms a drain passage.

A fifth exemplary arrangement includes a wheel support apparatus including a hub wheel which includes a hub shaft and is to mount a wheel thereon, a first side surface spline being formed on an end surface of the hub shaft, and a constant velocity joint which includes an outer ring connected to the hub shaft in a torque-transmitting manner, a second side surface spline meshed with the first side surface spline being formed on an end surface of a side wall portion of the outer ring abutting against the end surface of the hub shaft. In the exemplary wheel support apparatus each of the first and second side surface splines includes a number of spline teeth and bottom lands defined between the spline teeth, the tooth tops of the spline teeth of one of the first and second side splines and the bottom lands of the other side surface spline are formed into an arc-shaped surface disposed on a circle having a center disposed on a center of pivotal movement of the constant velocity joint, and the arc-shaped tooth tops contact the corresponding arc-shaped bottom lands so that the hub shaft and the outer ring can be aligned with each other.

A sixth exemplary arrangement includes the wheel support bearing apparatus according to the fifth exemplary arrangement, in which an end portion of the hub shaft is caulked radially outwardly to form a caulked portion to which an inner ring of a rolling bearing is fixed, and the first side spline is formed on an end surface of the caulked portion.

A seventh exemplary arrangement includes the wheel support apparatus according to the fifth exemplary arrangement, in which at least one of the spline teeth of at least one of the first and second side surface splines is removed to form a removal portion which forms a drain passage.

An eighth exemplary arrangement includes a wheel support apparatus including a hub wheel which includes a hub shaft and is to mount a wheel thereon, a first side surface spline being formed on an end surface of the hub shaft, and a constant velocity joint which includes an outer ring connected to the hub shaft in a torque-transmitting manner, a second side surface spline meshed with the first side surface spline being formed on an end surface of a side wall portion of the outer ring abutting against the end surface of the hub shaft. In the exemplary wheel support apparatus each of the first and second side surface splines includes a number of spline teeth and bottom lands defined between the spline teeth, wherein the tooth tops of the spline teeth of one of the two side splines and the bottom lands of the other side spline are formed into a tapering surface inclined relative to a plane perpendicular to a center axis of the hub shaft, and wherein the tapering tooth tops contact the corresponding tapering bottom lands so that the hub shaft and the outer ring can be aligned with each other.

A ninth exemplary arrangement includes the wheel support bearing apparatus according to (8), in which an end portion of the hub shaft is caulked radially outwardly to form a caulked portion to which an inner ring of a rolling bearing is fixed, and the first side spline is formed on an end surface of the caulked portion.

A tenth exemplary arrangement includes the wheel support apparatus according to eighth exemplary arrangement, in which at least one of the spline teeth of at least one of the first and second side surface splines is removed to form a removal portion which forms a drain passage.

With the first and second arrangements, during the travel of a vehicle (during the transmission of a torque), the torque of the outer ring of the constant velocity joint is transmitted to the hub shaft through the two side surface splines formed respectively on the end surface of the side wall portion of the outer ring and the end surface of the hub shaft, so that the wheel is rotated together with the hub wheel.

When muddy water or the like splashed up by the wheel intrudes into the interior through a clearance between the two meshed side surface splines during the travel of the vehicle, this muddy water or the like is flowed toward the outer peripheries of the two side surface splines under the influence of a centrifugal force, and is discharged (or drained) to the exterior through the drain passage formed by the removal portion (from which the tooth is removed) of the side surface spline.

Thus, the muddy water or the like intruding into the interior through a clearance between the two side surface splines meshed with each other can be satisfactorily discharged to the exterior through the drain passage, and therefore the development of rust can be prevented.

With the third and fourth arrangements, for example, during the travel of the vehicle, a torque of the constant velocity joint is transmitted to the hub wheel through the two side surface splines (formed respectively on the end surface of the hub shaft and the end surface of the outer ring of the constant velocity joint) meshing with each other, so that the wheel is driven to be rotated.

Thus, the torque of the constant velocity joint can be satisfactorily transmitted to the hub wheel through the two side surface splines meshing with each other, and therefore in contrast with the conventional structure, a relative slip between the end surface of the outer ring of the constant velocity joint and the end surface of the hub shaft of the hub wheel can be suppressed, thereby preventing the generation of an abnormal sound.

Furthermore, each bottom land of at least one of the two side surface splines has the mountain-like shape, and includes the radially-inner inclined surface, and the radially-outer inclined surface. Therefore, as compared with the case where each bottom land of each of the side surface splines is formed into an inclined surface gradually increasing in depth from its radially-inner end toward its radially-outer end, the area of non-contact portions of the two side surface splines can be reduced.

Namely, the meshing engagement of the two side surface splines can be prevented from being limited at the radially-inner portions of the bottom lands, and therefore the area of the non-contact portions of the two side surface splines can be reduced.

The area of the non-contact portions of the two side surface splines is thus reduced, and accordingly the area of contact between mating tooth flanks of the two side surface splines can be increased, and a contact pressure and a shear stress of the tooth flanks can be reduced, so that the durability can be enhanced.

With the fifth arrangement, when the outer ring of the constant velocity joint and the hub shaft are coupled together by tightening the connecting bolt, with the two side splines (formed respectively on the outer ring and the hub shaft) meshing with each other, each tooth top of the one side spline and the corresponding bottom land of the other side spline contact each other at their arc-shaped surfaces each disposed on the circle having the center disposed on the axis of pivotal movement of the constant velocity joint. Thus, these arc-shaped surfaces contact each other so that the hub shaft of the hub wheel and the outer ring of the constant velocity joint can be aligned with each other (that is, their center axes can coincide with each other), and therefore vibration and an abnormal sound caused by misalignment can be prevented.

Furthermore, each tooth top of the one side spline and the corresponding bottom land of the other side spline contact each other at their arc-shaped surfaces, and therefore the area of contact between the meshed side splines is larger as compared with the conventional structure of FIG. 19 in which the mating tooth top and bottom land contact each other at their surfaces parallel to a plane perpendicular to the center axis of the hub shaft. Therefore, the torque-transmitting ability is more excellent.

Furthermore, when a load is exerted so as to incline or pivotally move the center axis of the hub shaft relative to the center axis of the outer ring of the constant velocity joint about the axis of pivotal movement of the constant velocity joint, for example, during the travel of the vehicle, this load can be received by the relevant tooth tops (arc-shaped surfaces) and bottom lands (arc-shaped surfaces) of the two side splines in such a manner that this load is distributed over the entire arc-shaped contact surfaces of the relevant tooth tops and bottom lands of the two side splines. Therefore, this load is prevented from concentrating on localized portions (outer peripheral portions) of the two side splines, and therefore the excellent durability can be obtained.

With the eighth arrangement, when the outer ring of the constant velocity joint and the hub shaft are coupled together by tightening the connecting bolt, with the two side splines (formed respectively on the outer ring and the hub shaft) meshing with each other, each tooth top of the one side spline and the corresponding bottom land of the other side spline contact each other at their tapering surfaces.

Thus, each tapering tooth top of the one side spline and the corresponding tapering bottom land of the other side spline contact each other so that the hub shaft of the hub wheel and the outer ring of the constant velocity joint can be aligned with each other (that is, their center axes can coincide with each other), and therefore vibration and an abnormal sound caused by misalignment can be prevented.

Furthermore, each tooth top and the corresponding bottom land of the two side splines contact each other at their tapering surfaces, and therefore the area of contact between the meshed side splines is larger as compared with the conventional structure in which the mating tooth top and bottom land contact each other at their surfaces parallel to a plane perpendicular to the center axis of the hub shaft. Therefore, the torque-transmitting ability is more excellent.

With the sixth and ninth arrangements, the side spline is formed on the end surface of the caulked portion of the hub shaft of the hub wheel, and by doing so, the outer diameter of this side spline can be made larger. Then, the side spline corresponding in outer diameter to the side spline of the hub shaft is formed on an end surface of an end wall portion of the outer ring of the constant velocity joint, and the two side splines are meshed with each other, and with this construction the torque-transmitting ability can be enhanced.

DETAILED DESCRIPTION OF PREFERRED EMBODIMENTS

First Embodiment

A first embodiment of the present invention will be described with reference to FIGS. 1 and 2.

Figure 1:
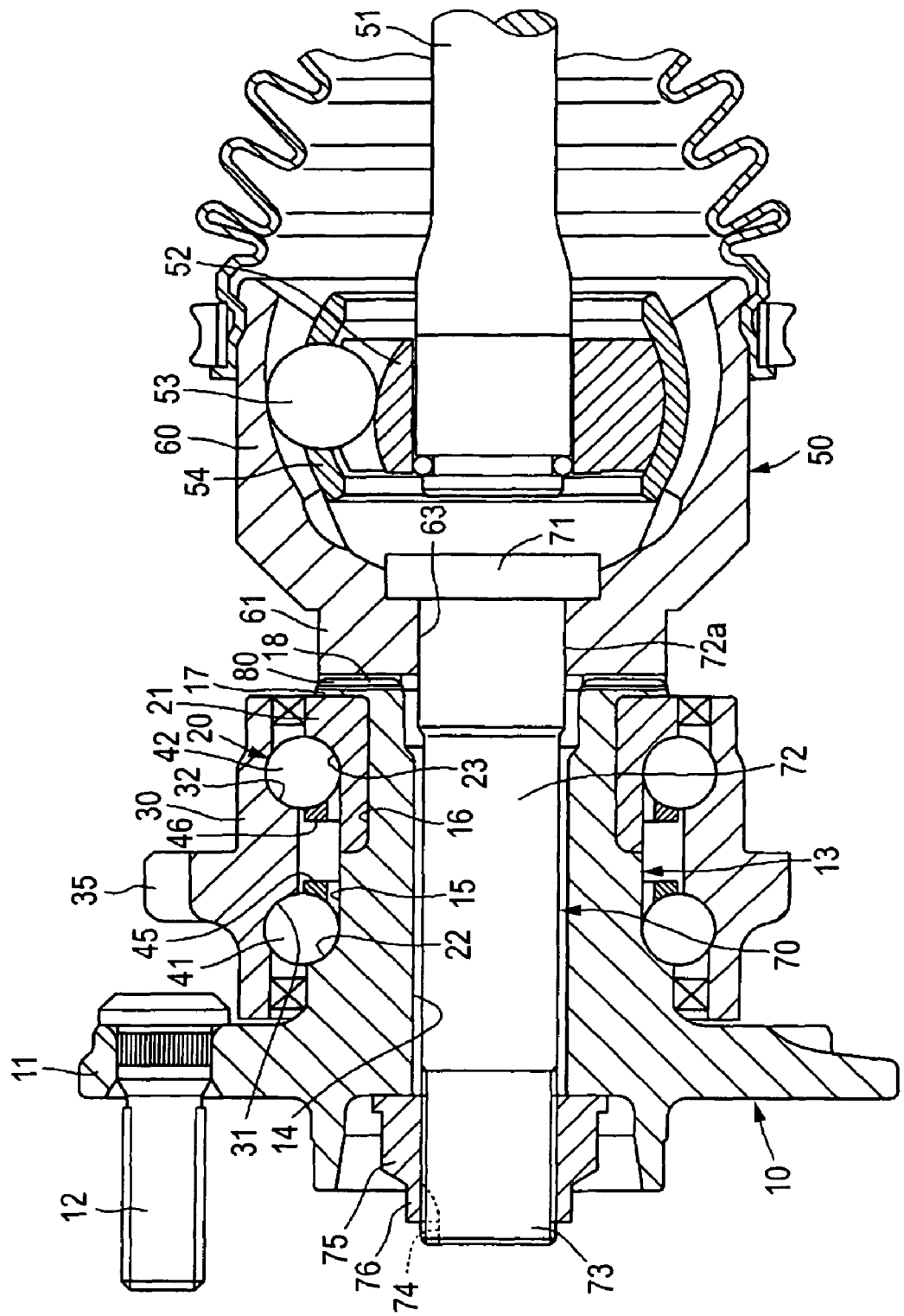
FIG. 1 is a side cross-sectional view showing a first embodiment of a wheel support apparatus of the present invention.
Figure 2:
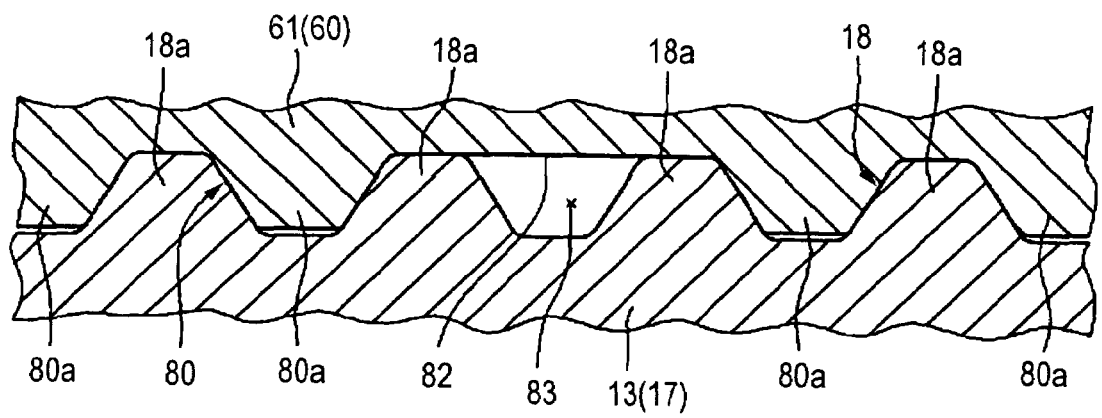
FIG. 2 is a developed view showing a condition in which two side surface splines formed respectively on an end surface of a hub shaft and an end surface of a side wall portion of an outer ring of a constant velocity joint are in mesh with each other.

FIG. 1 is a side cross-sectional view showing the first embodiment of a wheel support apparatus of the invention. FIG. 2 is an enlarged perspective view showing a portion of a side surface spline formed on an end surface of a hub shaft of a hub wheel.

As shown in FIG. 1, the wheel support apparatus of this first embodiment comprises the hub wheel 10, a double row angular contact ball bearing 20 serving as a rolling bearing, and a constant velocity joint 50.

As shown in FIG. 1, the hub wheel 10 includes a cylindrical hub shaft 13, and a flange 11 formed integrally on an outer peripheral surface of the hub shaft 13 and disposed adjacent to one end of this hub shaft 13. A plurality of hub bolts 12 are fixedly secured to the flange 11 by press-fitting, and are arranged at a predetermined pitch in a circumferential direction, and these hub bolts 12 are used to mount a wheel (not shown) on the flange 11, with a brake rotor (not shown) interposed the flange 11 and the wheel.

The double row angular contact ball bearing 20 is mounted on the outer periphery of the hub shaft 13, and this ball bearing 20 comprises an outer ring 30, an inner ring 21, a row of balls 41, a row of balls 42, and cages 45 and 46.

In this first embodiment, the hub shaft 13 of an integral construction includes a larger-diameter shaft portion 15 disposed close to the flange 11, and a smaller-diameter shaft portion 16 which is suitably smaller in diameter than the larger-diameter shaft portion 15 and is continuous with the larger-diameter shaft portion 15 with a step portion formed therebetween. A raceway surface 22 corresponding to one raceway surface 31 of the outer ring 30 is formed on an outer peripheral surface of the larger-diameter shaft portion 15.

A raceway surface 23 corresponding to the other raceway surface 32 of the outer ring 30 is formed on an outer peripheral surface of the inner ring 21. After the inner ring 21 is fitted on an outer peripheral surface of the smaller-diameter shaft portion 16 of the hub shaft 13, a distal end portion of the smaller-diameter shaft portion 16 is caulked or deformed to form a caulked portion 17, and by doing so, the inner ring 21 is fixed between the step portion and the caulked portion 17.

The row of balls 41 and the cage 45 holding these balls 41 are disposed between the raceway surface 31 of the outer ring 30 and the raceway surface 22 of the hub shaft 13, and also the row of balls 42 and the cage 46 holding these balls 42 are disposed between the raceway surface 32 of the outer ring 30 and the raceway surface 23 of the inner ring 21.

A fixing flange 35 is formed integrally on the outer peripheral surface of the outer ring 30, and is adapted to be mounted by bolts on a vehicle-side member (a knuckle or a carrier) supported on a suspension (not shown) of a vehicle.

In this embodiment, a well-known constant velocity joint called a Rzeppa type or Birfield type is used as the constant velocity joint 50 as shown in FIG. 1. This constant velocity joint 50 comprises an inner ring 52 mounted on one end portion of a drive shaft 51 for rotation therewith, an outer ring 60, and a row of balls 53 disposed between the inner and outer rings 52 and 60, and a cage 64 holding the row of balls 53.

An connecting bolt 70 for connecting the hub wheel 10 and the constant velocity joint 50 together projects from a central portion of a side wall portion 61 of the outer ring 60 of the constant velocity joint 50.

In this first embodiment, the connecting bolt 70 is separate from the outer ring 60 of the constant velocity joint 50, and has a head 71 and a shank 72. A through hole 63 is formed through the central portion of the side wall portion 61 of the outer ring 60 of the constant velocity joint 50.

The shank 72 of the connecting bolt 70 is passed through the through hole 63 (in the outer ring 60 of the constant velocity joint 50) from an inner open end thereof, and a larger-diameter portion 72a defining a proximal end portion of the shank 72 is press-fitted into the through hole 63 until a lower surface of the head 71 is brought into abutting engagement with the inner surface of the side wall portion 61, and by doing so, the connecting bolt 70 is fixed to the outer ring 60 of the constant velocity joint 50 such that the shank 72 projects from the side wall portion 61 of the outer ring 60. An male-threaded portion 73 is formed on a distal end portion of the shank 72 of the connecting bolt 70, and a caulking groove 74 for preventing the rotation of a lock nut 75 is formed in the male-threaded portion 73.

As shown in FIG. 1, a side surface spline 18 is formed on the end surface of the hub shaft 13 of the hub wheel 10 (that is, on the end surface of the caulked portion 17 of the hub shaft 13 in this first embodiment), and a side surface spline 80 is formed on the end surface of the side wall portion 61 of the outer ring 60 (of the constant velocity joint 50) abutting against the end surface of the hub shaft 13, and the two side surface splines 18 and 80 are meshed with each other to connect the hub shaft 13 and the outer ring 60 of the constant velocity joint 50 together in a torque-transmitting manner.

The hub wheel 10 and the constant velocity joint 50 are generally unitarily coupled together so as to transmit a torque in the following manner.

Namely, first, the shank 72 of the interconnecting bolt 70 projecting from the end surface of the side wall portion 61 of the outer ring 60 of the constant velocity joint 50 is inserted into a bore 14 of the hub shaft 13 from one end thereof (that is, the inboard end in the direction of the width of the vehicle) toward the other end thereof (that is, the outboard end in the width of the vehicle).

Then, the male-threaded portion 73 at the distal end portion of the shank 72 of the connecting bolt 70 is projected outwardly from the other end of the bore 14 such that the side surface spline 80 on the end surface of the hub shaft 13 is meshed with the side surface spline 90 on the end surface of the side wall portion 61 of the outer ring 60 of the constant velocity joint 50. In this condition, the lock nut 75 is fastened onto the male-threaded portion 73. Then, part of a thinned end portion 76 of the lock nut 75 is caulked or deformed into the caulking groove 74 in the male-threaded portion 73, thereby preventing the rotation of the lock nut 75, and by doing so, the hub wheel 10 and the constant velocity joint 50 are coupled together in a torque-transmitting manner.

The side surface spline 18 formed on the end surface of the hub shaft 13 includes a number of teeth (spline teeth) 18a, and the side surface spline 80 formed on the end surface of the side wall portion 61 of the outer ring 60 of the constant velocity joint 50 includes a number of teeth (spline teeth) 80a. At least one of the teeth 18a, 80a of at least one of the two side surface splines 18 and 80 is removed to form a removal portion 82 which forms a drain passage 83, as shown in FIG. 2.

In this first embodiment, one of the teeth 80a of the side surface spline 80 formed on the end surface of the outer ring 60 of the constant velocity joint 50 is removed to form the removal portion 82 which forms the drain passage 83.

The wheel support apparatus of this first embodiment has the above construction.

Therefore, for example, during the travel of the vehicle, a torque of the drive shaft 51 is transmitted sequentially to the inner ring 52, the balls 53 and the outer ring 60 of the constant velocity joint 50, so that the outer ring 60 is rotated in the same direction as the direction of rotation of the drive shaft 51.

The torque transmitted to the constant velocity joint 50 is further transmitted to the hub wheel 10 through the two side surface splines 18 and 80 (formed respectively on the end surface of the hub shaft 13 (that is, the end surface of the caulked portion 17) and the end surface of the side wall portion 61 of the outer ring 60 of the constant velocity joint 50) meshing with each other, so that the wheel is driven to be rotated.

When muddy water or the like splashed up by the wheel intrudes into the interior through a clearance between the two meshed side surface splines 18 and 80 during the travel of the vehicle, this muddy water or the like is flowed toward the outer peripheries of the side surface splines 18 and 80 under the influence of a centrifugal force, and is discharged (or drained) to the exterior through the drain passage 83 formed by the removal portion 82 (from which the tooth 80a is removed) of the side surface spline 80.

Thus, the muddy water or the like intruding into the interior through a clearance between the two side surface splines 18 and 80 meshed with each other can be satisfactorily discharged to the exterior through the drain passage 83, and therefore the development of rust can be prevented.

Figure 3:
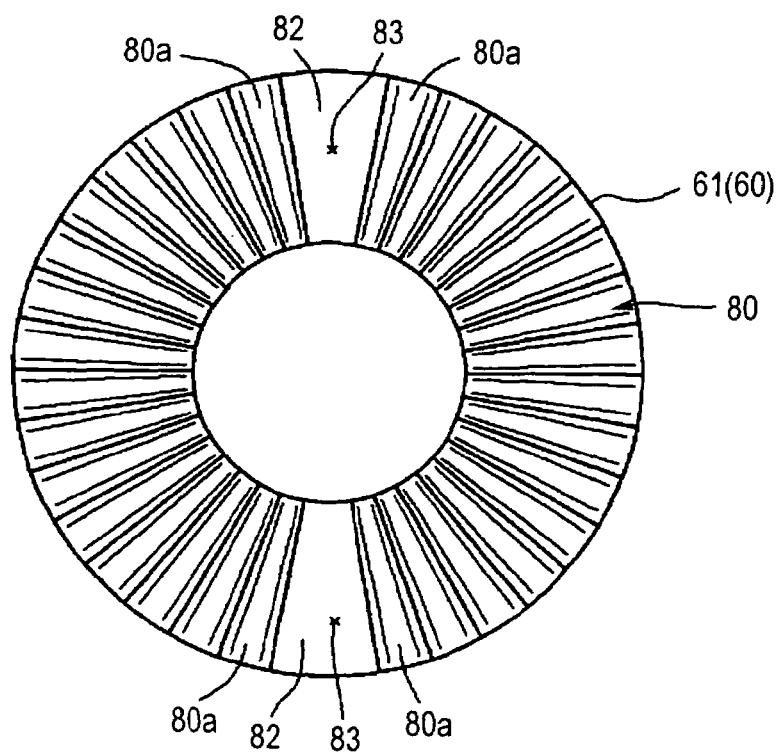
FIG. 3 is a view explanatory of a modified form of the invention in which two of a number of teeth of the side surface spline which are spaced through an angle of approximately 180 degrees from each other are removed.
Figure 4:
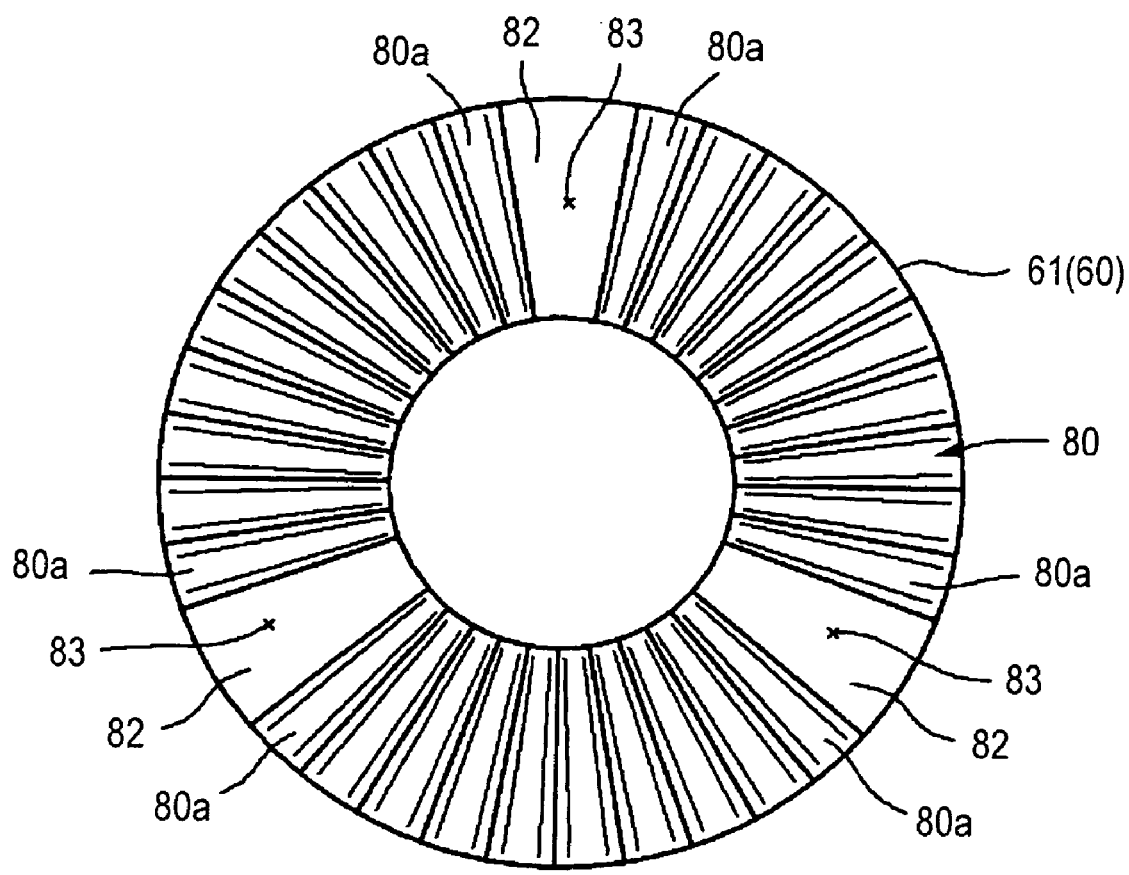
FIG. 4 is a view explanatory of another modified form of the invention in which three of a number of teeth of the side surface spline which are spaced through an angle of approximately 120 degrees from one another are removed.

In the above first embodiment, one of the teeth 80a of the side surface spline 80 formed on the end surface of the side wall portion 61 of the outer ring 60 of the constant velocity joint 50 is removed to form the removal portion 82 which forms the discharge passage 83. However, two of the teeth 80a of the side surface spline 80 which are spaced through an angle of approximately 180 degrees from each other can be removed to form two removal portions 82 which form respective drain passages 83, as shown in FIG. 3. In another modified form of the invention, three of the teeth 80a of the side surface spline 80 which are spaced through an angle of approximately 120 degrees from one another are removed to form three removal portions 82 which form respective drain passages 83, as shown in FIG. 4.

Namely, the number of the teeth 80a to be removed from the side surface spline 80 can be suitably determined in so far as the transmission of a torque through the two meshed side surface splines 18 and 80 will not be adversely affected.

In the case where at least one of the teeth 18a of the side surface spline 18 formed on the end surface of the hub shaft 13 of the hub wheel 10 is removed to form a removal portion which forms a drain passage, also, similar advantageous effects can be achieved.

Second Embodiment

Next, a second embodiment of the invention will be described with reference to FIG. 5.

Figure 5:
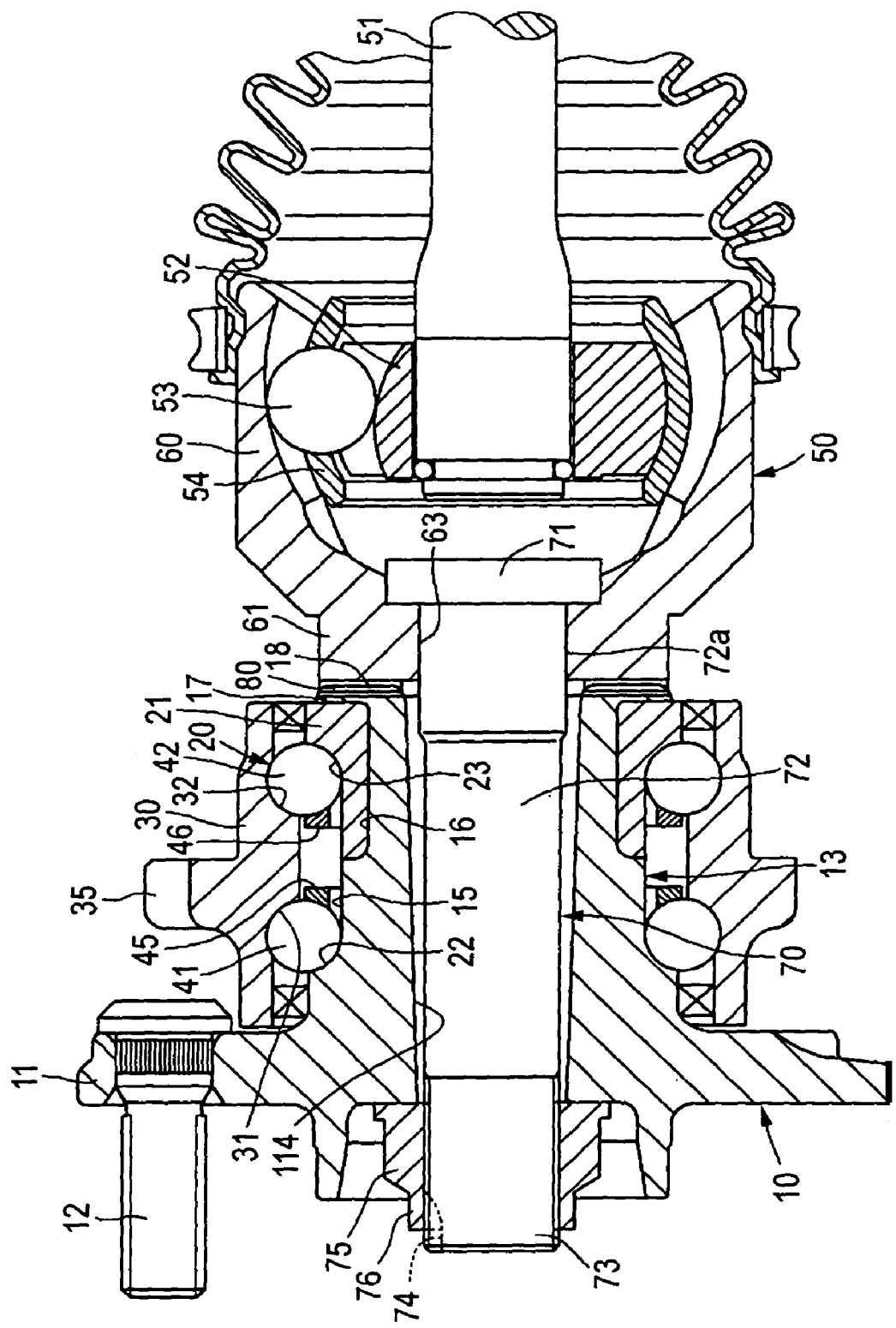
FIG. 5 is a side cross-sectional view of a second embodiment of a wheel support apparatus of the invention.

FIG. 5 is a side cross-sectional view showing the second embodiment of a wheel support apparatus of the invention.

As shown in FIG. 5, in this second embodiment, a bore 114 of a hub shaft 13 of a hub wheel 10 is formed into a tapering hole, and has one end of a larger diameter disposed close to a side surface spline 18, and is gradually decreasing in diameter from the one end thereof toward the other end thereof.

The other construction of this second embodiment is similar to that of the first embodiment, and therefore those portions of the second embodiment identical in construction to the corresponding portions of the first embodiment are designated by identical reference numerals, respectively, and description thereof is omitted.

Therefore, in this second embodiment, also, when muddy water or the like splashed up by the wheel intrudes into the interior through a clearance between two meshed side surface splines 18 and 80 during the travel of the vehicle, this muddy water or the like is flowed toward the outer peripheries of the side surface splines 18 and 80 under the influence of a centrifugal force, and is discharged (or drained) to the exterior through a drain passage 83 formed by a removal portion 82 (from which a tooth 80a is removed) of the side surface spline 80.

Particularly in this second embodiment, the muddy water or the like, intruding into the one end portion of the bore (tapering hole) 114 of the hub shaft 13 through a clearance between the two side surface splines 18 and 80 meshed with each other, is restrained from flowing toward the other end of the bore 114, and therefore the draining ability can be enhanced.

Third Embodiment

A third embodiment of the present invention will be described with reference to FIGS. 6 to 9.

Figure 6:
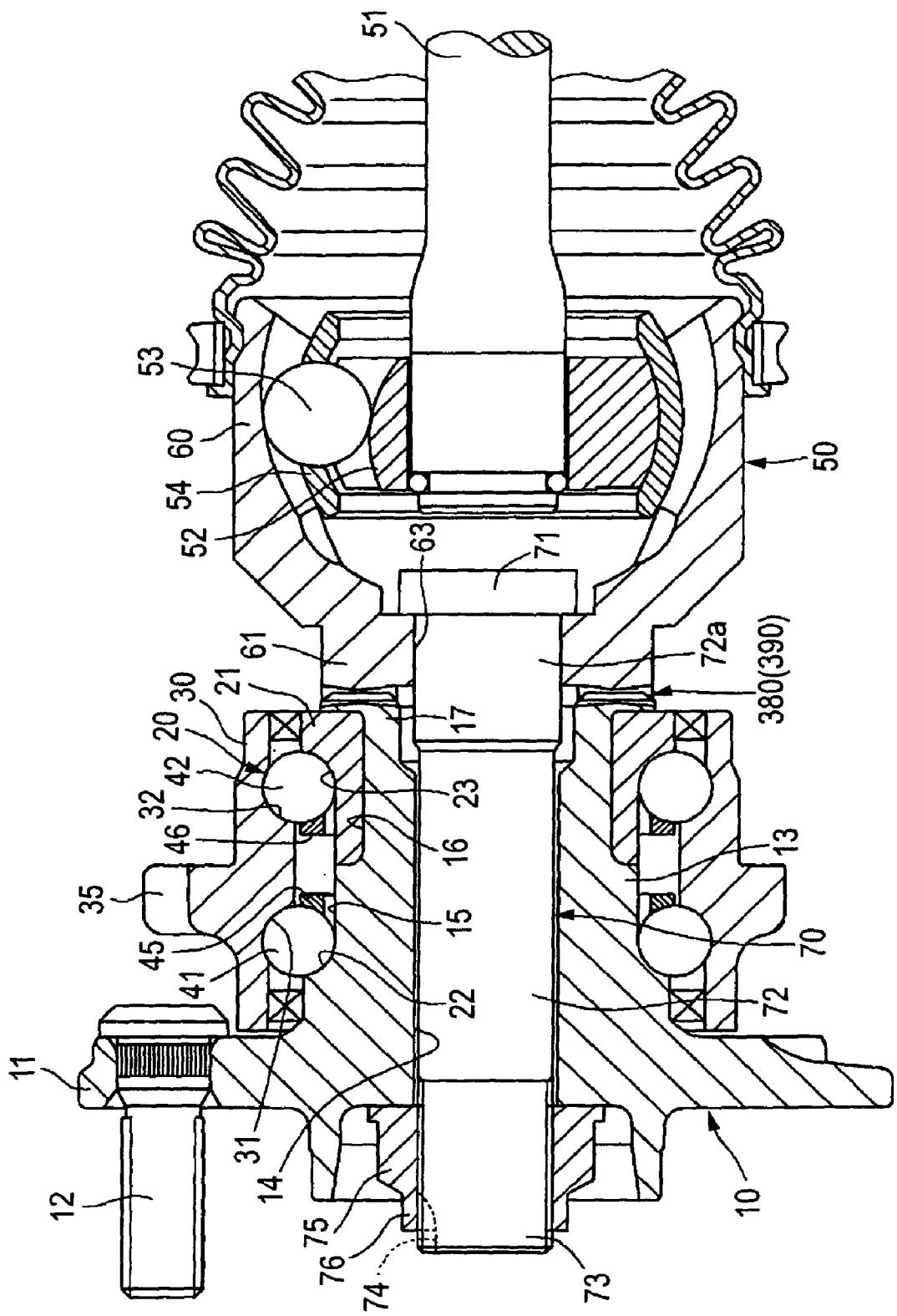
FIG. 6 is a side cross-sectional view showing a wheel support apparatus according to a third embodiment of the present invention.
Figure 7:
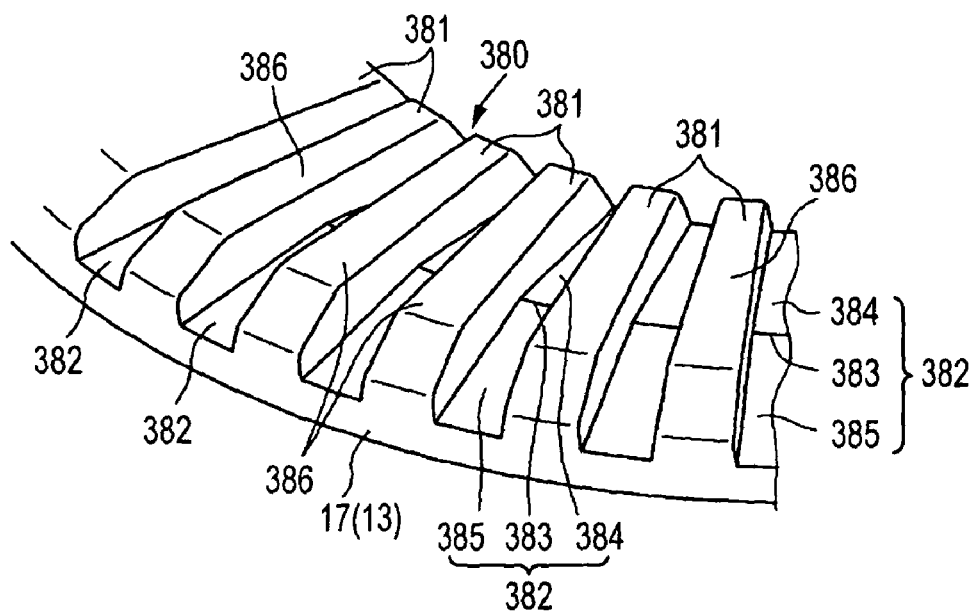
FIG. 7 is an enlarged perspective view showing a portion of a side surface spline formed on an end surface of a hub shaft of a hub wheel.
Figure 8:
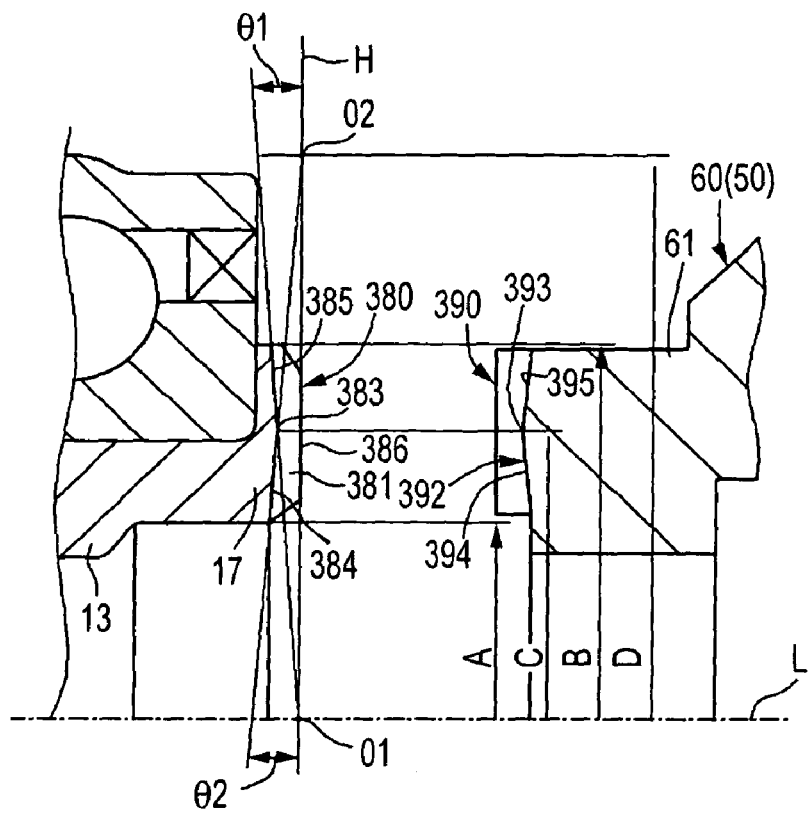
FIG. 8 is an enlarged cross-sectional view showing a condition in which two side surface splines are separated from each other.
Figure 9:
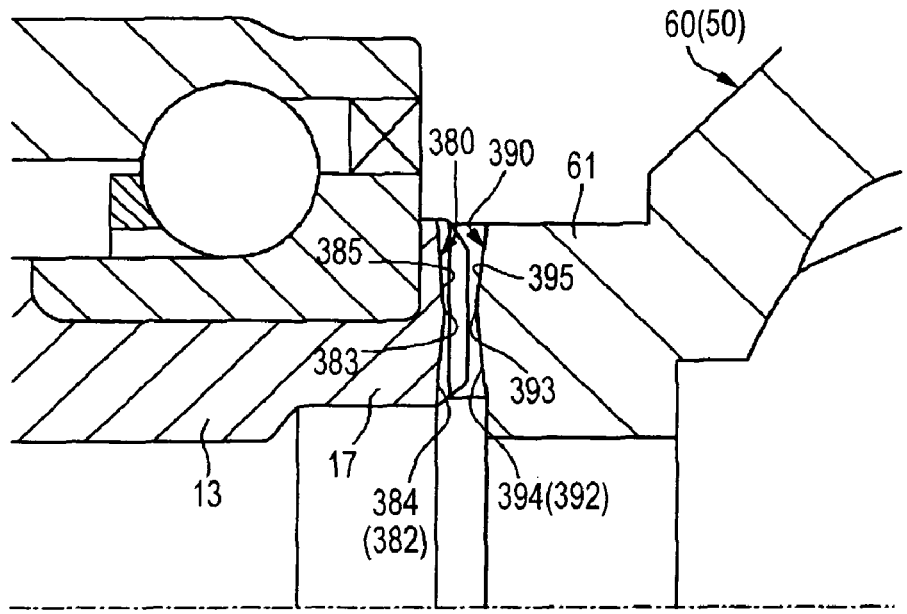
FIG. 9 is an enlarged cross-sectional view showing a condition in which the two side surface splines are meshed with each other.

FIG. 6 is a side cross-sectional view showing a wheel support apparatus according to the third embodiment of the invention. FIG. 7 is an enlarged perspective view showing a portion of a side surface spline formed on an end surface of a hub shaft of a hub wheel. FIG. 8 is an enlarged cross-sectional view showing a condition in which two side surface splines are separated from each other. FIG. 9 is an enlarged cross-sectional view showing a condition in which the two side surface splines are meshed with each other.

In the third embodiment of the invention, those portions similar in construction to the corresponding portions of the first embodiment will be designated by identical reference numerals, respectively, and explanation thereof will be omitted.

As shown in FIGS. 6 and 7, a side surface spline 380 is formed on the end surface of the hub shaft 13 of the hub wheel 10 (that is, on the end surface of the caulked portion 17 of the hub shaft 13 in this third embodiment), and a side surface spline 490 is formed on the end surface of the side wall portion 61 of the outer ring 60 (of the constant velocity joint 50) abutting against the end surface of the hub shaft 13, and the two side surface splines 380 and 390 are meshed with each other to connect the hub shaft 13 and the outer ring 60 of the constant velocity joint 50 together in a torque-transmitting manner.

As shown in FIGS. 7 and 8, each of bottomlands 382 of spline teeth 381 of the side surface spline 380 formed on the end surface of the caulked portion 17 of the hub shaft 13 is formed into a mountain-like shape, and has an apex 383 disposed on a base circle (having a diameter C) lying generally midway between (that is, lying generally in the middle of the distance between) a circular inner periphery (having a diameter A) of the caulked portion 17 of the hub shaft 13 and a circular outer periphery (having a diameter B) thereof, and includes a radially-inner inclined surface 384 gradually increasing in depth from the apex 383 toward a radially-inner end thereof, and a radially-outer inclined surface 385 gradually increasing in depth from the apex 383 toward a radially-outer end thereof.

In this third embodiment, here, a center axis of the caulked portion 17 is represented by L, and a reference line disposed perpendicularly to the center axis L and extending on and along a tooth top 386 of the spline tooth 381 of the side surface spline 380 is represented by H, and a point of intersection of the center axis L and the reference line H is represented by O1, and a point of intersection of the reference line H and a circle having a diameter D twice larger than the diameter C of the base circle is represented by O2. Then, the radially-outer inclined surfaces 385 are disposed on a conical surface passing through the intersection point O1 and inclined at an angle θ1 relative to the reference line H.

The apex 383 is disposed at a point of intersection of the above conical surface (passing through the intersection point O1 and inclined at the angle θ1 relative to the reference line H) and the base circle (having the diameter C). The radially-inner inclined surfaces 384 are disposed on a conical surface passing through the intersection point O2 and inclined at an angle θ2 (which is equal to the angle θ1) relative to the reference line H.

On the other hand, each of bottom lands 392 of spline teeth 391 of the side surface spline 390 formed on the end surface of the side wall portion 61 of the outer ring 60 of the constant velocity joint 50 is also formed into a mountain-like shape as described above for the side surface spline 380 on the hub shaft 13, and each bottom land 392 includes a radially-inner inclined surface 394 gradually increasing in depth from an apex 393 toward a circular inner periphery of the side wall portion 61, and a radially-outer inclined surface 395 gradually increasing in depth from the apex 393 toward a circular outer periphery of the side wall portion 61.

The hub wheel 10 and the constant velocity joint 50 are generally unitarily coupled together so as to transmit a torque in the following manner.

Namely, first, the shank 72 of the connecting bolt 70 projecting from the end surface of the side wall portion 61 of the outer ring 60 of the constant velocity joint 50 is inserted into a bore 14 of the hub shaft 13 from one end thereof (that is, the inboard end in the direction of the width of the vehicle) toward the other end thereof (that is, the outboard end in the width of the vehicle).

Then, the male-threaded portion 73 at the distal end portion of the shank 72 of the connecting bolt 70 is projected outwardly from the other end of the bore 14 such that the side surface spline 380 on the end surface of the hub shaft 13 is meshed with the side surface spline 390 on the end surface of the side wall portion 61 of the outer ring 60 of the constant velocity joint 50. In this condition, the lock nut 75 is fastened onto the male-threaded portion 73. Then, part of a thinned end portion 76 of the lock nut 75 is caulked or deformed into the caulking groove 74 in the male-threaded portion 73, thereby preventing the rotation of the lock nut 75, and by doing so, the hub wheel 10 and the constant velocity joint 50 are coupled together in a torque-transmitting manner (see FIG. 6).

The wheel support apparatus of this third embodiment has the above construction.

Therefore, for example, during the travel of the vehicle, a torque of the drive shaft 51 is transmitted sequentially to the inner ring 52, the balls 53 and the outer ring 60 of the constant velocity joint 50, so that the outer ring 60 is rotated in the same direction as the direction of rotation of the drive shaft 51.

The torque thus transmitted to the constant velocity joint 50 is further transmitted to the hub wheel 10 through the two side surface splines 380 and 390 (formed respectively on the end surface of the hub shaft 13 and the end surface of the outer ring 60 of the constant velocity joint 50) meshing with each other, so that the wheel is driven to be rotated.

As described above, the torque can be satisfactorily transmitted from the constant velocity joint 50 to the hub wheel 10 through the two side surface splines 380 and 390 meshing with each other.

Therefore, in contrast with the conventional structure, a relative slip between the end surface of the outer ring 60 of the constant velocity joint 50 and the end surface of the hub shaft 13 (that is, the end surface of the caulked portion 17) of the hub wheel 10 can be satisfactorily suppressed. Therefore, the generation of an abnormal sound due to a relative slip between the end surface of the outer ring 60 of the constant velocity joint 50 and the end surface of the hub shaft 13 of the hub wheel 10 can be prevented.

Furthermore, each bottom land 382, 392 of each of the two side surface splines 380, 390 has the mountain-like shape, and includes the radially-inner inclined surface 384, 394, and the radially-outer inclined surface 385, 395. Therefore, as compared with the case where each bottom land of each of the two side surface splines is formed into an inclined surface gradually increasing in depth from its radially-inner end toward its radially-outer end, the area of non-contact portions of the two side surface splines 380 and 390 can be reduced.

Namely, the radially-inner inclined surface 384, 394 is formed at each bottom land 382, 392 of each of the two side surface splines 380, 390, and by doing so, the meshing engagement of the two side surface splines 380 and 390 can be prevented from being limited at the radially-inner portions of the bottom lands 382, 392. Therefore, the area of the non-contact portions of the two side surface splines 380, 390 can be reduced.

The area of the non-contact portions of the two side surface splines 380, 390 is thus reduced, and accordingly the area of contact between tooth flanks of the mating spline teeth of the two side surface splines 380, 390 can be increased, and a contact pressure and a shear stress of the tooth flanks can be reduced, so that the durability can be enhanced.

Fourth Embodiment

Next, a fourth embodiment of the invention will be described with reference to FIGS. 10 and 11.

Figure 10:
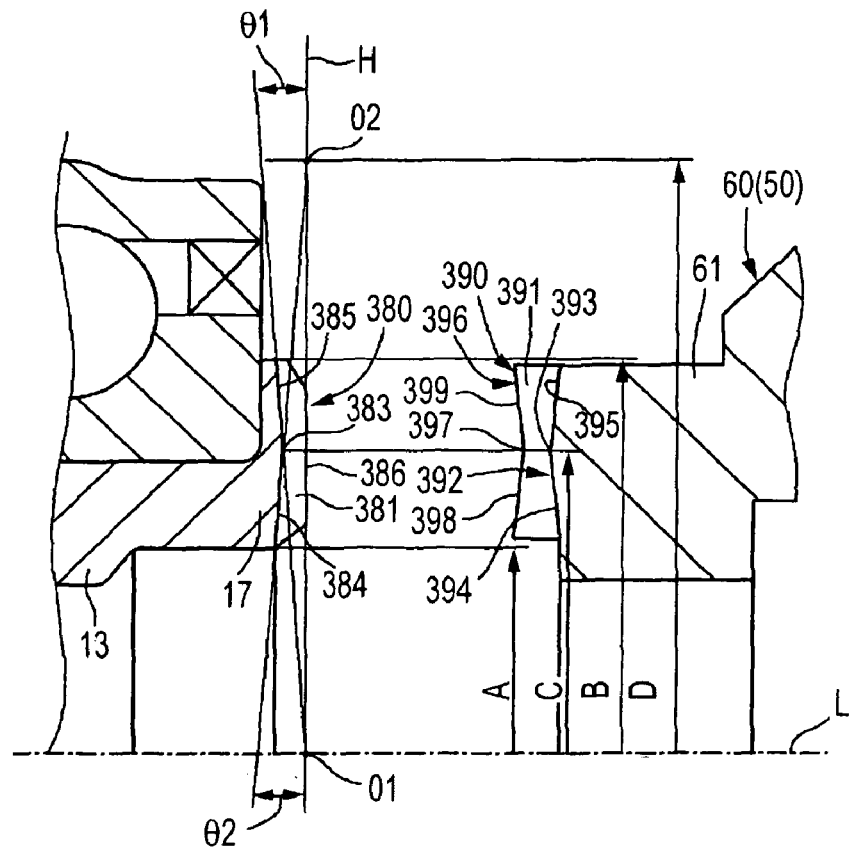
FIG. 10 is an enlarged cross-sectional view showing a condition in which two side surface splines employed in a wheel support apparatus according to a fourth embodiment of the invention are separated from each other.

FIG. 10 is an enlarged cross-sectional view showing a condition in which two side surface splines employed in a wheel support apparatus according to a fourth embodiment of the invention are separated from each other. FIG. 11 is an enlarged cross-sectional view showing a condition in which the two side surface splines are meshed with each other.

Figure 11:
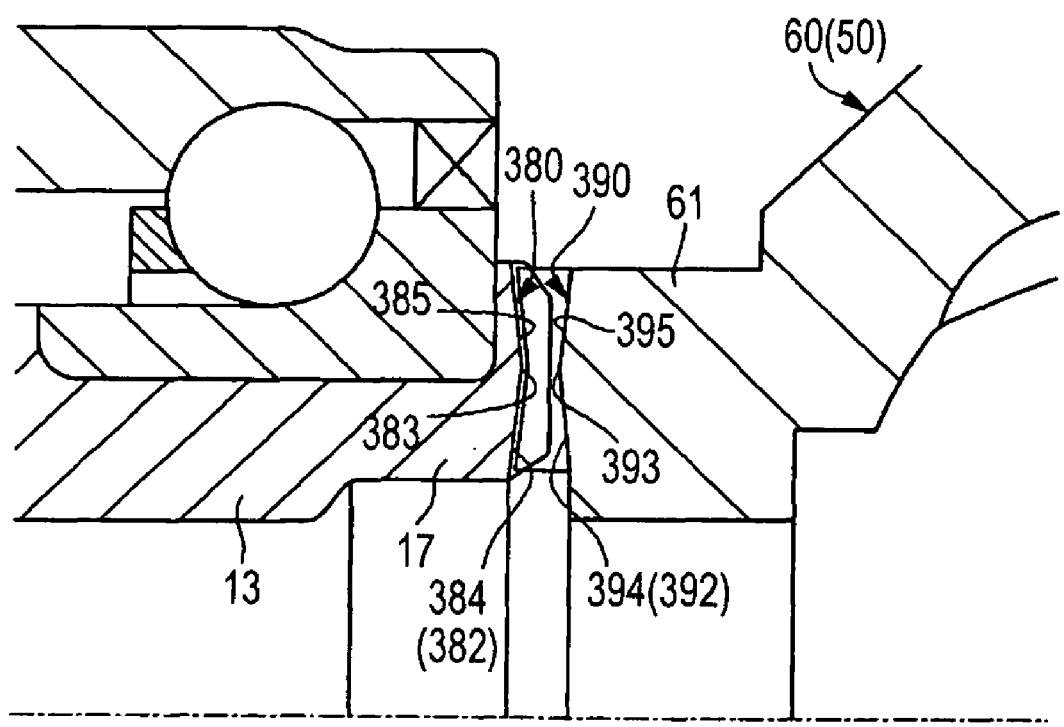
FIG. 11 is an enlarged cross-sectional view showing a condition in which the two side surface splines are meshed with each other.

As shown in FIGS. 10 and 11, in this fourth embodiment, a tooth top 396 (or 386) of each spline tooth 391 (or 381) of one (390 (or 380)) of the two side surface splines 380, 390 is formed into a shape corresponding or conforming to a shape of each bottom land 382 (or 392) of the other side surface spline 380 (or 390).

Namely, as shown in FIG. 10, the tooth top 396 of each spline tooth 391 of the side surface spline 390 formed on an end surface of an outer ring 60 of a constant velocity joint 50 is formed into a V-shape, and has a valley portion 397 opposed to an apex 383 of the bottom land 382 of the spline tooth 381 of the side surface spline 380 formed on an end surface of a hub shaft 13, and includes a radially-inner tooth top portion 398 gradually increasing in height from the valley portion 397 toward a radially-inner end thereof, and a radially-outer tooth top portion 399 gradually increasing in height from the valley portion 397 toward a radially-outer end thereof.

The other construction of this fourth embodiment is similar to that of the third embodiment, and therefore those portions of the fourth embodiment identical in construction to the corresponding portions of the third embodiments are designated by identical reference numerals, respectively, and description thereof is omitted.

In the wheel support apparatus of this fourth embodiment having the above construction, the tooth top 396 of each spline tooth 391 of the one side surface spline 390 is formed into the V-shape corresponding to the mountain-like shape of the bottom land 382 of the other side surface spline 380. With this construction, the area of non-contact portions of the two side surface splines 380, 390 can be further reduced, and accordingly the area of contact between mating tooth flanks of the two side surface splines 380, 390 can be increased. Therefore, a contact pressure and a shear stress of the tooth flanks can be effectively reduced.

The present invention is not limited to the above third and fourth embodiments.

For example, in the above third and fourth embodiments, each bottom land 382, 392 of each of the two side surface splines 380, 390 is formed into the mountain-like shape, and has the radially-inner inclined surface 384, 394 and the radially-outer inclined surface 385, 395. However, each bottom land 82 or 92 of one of the two side surface splines 380, 390 may be formed into the mountain-like shape, and has the radially-inner inclined surface 384 or 394 and the radially-outer inclined surface 385 or 395, and in this case, also, the advantageous effects of the present invention can be achieved.

Furthermore, in the above third embodiment, the connecting bolt 70 separate from the outer ring 60 of the constant velocity joint 50 is press-fitted into the through hole 63 of the side wall portion 61 of the outer ring 60, and is fixed to the outer ring 60. However, an connecting bolt portion may be formed integrally with and extending from the side wall portion 61 of the outer ring 60, and in this case, also, the advantageous effects of the invention can be achieved.

Furthermore, instead of the double row angular contact ball bearing 20 serving as the rolling bearing of the hub wheel, a double row tapered roller bearing can be used, and in this case, also, the advantageous effects of the invention can be achieved.

Fifth Embodiment

A fifth embodiment of the present invention will be described hereinafter with reference to FIGS. 12 to 14.

Figure 12:
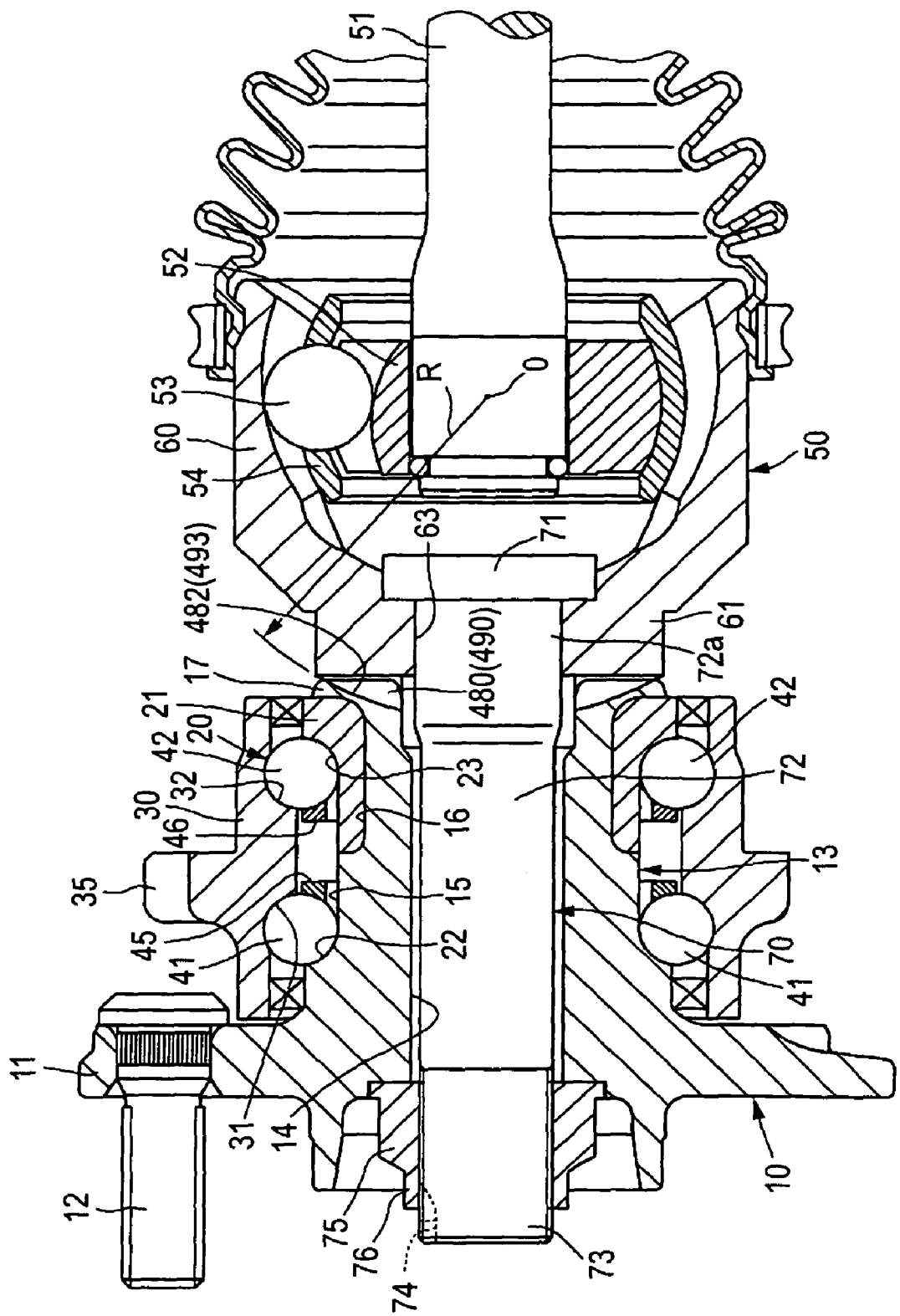
FIG. 12 is a longitudinal cross-sectional view showing a wheel support bearing apparatus according to a fifth embodiment of the present invention.

FIG. 12 is a longitudinal cross-sectional view showing a wheel support bearing apparatus according to a fifth embodiment of the present invention. FIG. 13 is an enlarged cross-sectional view showing a condition in which two side splines are separated from each other. FIG. 14 is an enlarged cross-sectional view showing a condition in which the two side splines are in mesh with each other.

In the fifth embodiment of the invention, those portions similar in construction to the corresponding portions of the first embodiment will be designated by identical reference numerals, respectively, and explanation thereof will be omitted.

Figure 13:
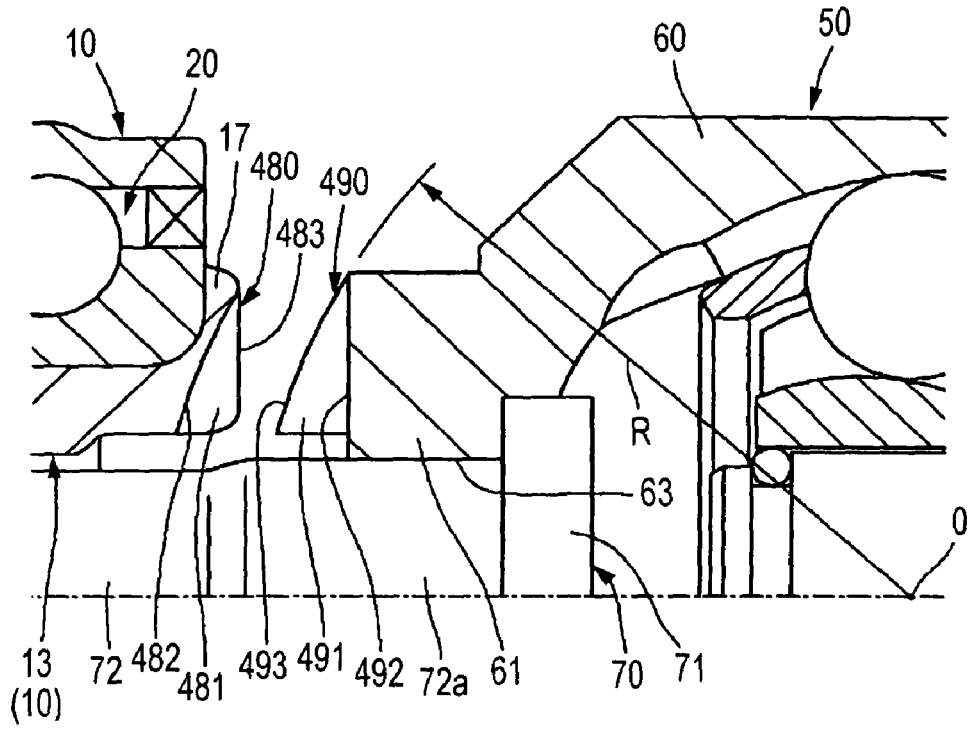
FIG. 13 is an enlarged cross-sectional view showing a condition in which two side splines are separated from each other.

As shown in FIGS. 12 and 13, a side surface spline 480 is formed on the end surface of the hub shaft 13 of the hub wheel 10 (that is, on the end surface of the caulked portion 17 of the hub shaft 13 in this fifth embodiment), and a side surface spline 490 is formed on the end surface of the side wall portion 61 of the outer ring 60 (of the constant velocity joint 50) abutting against the end surface of the hub shaft 13, and the two side surface splines 480 and 490 are meshed with each other to connect the hub shaft 13 and the outer ring 60 of the constant velocity joint 50 together in a torque-transmitting manner.

Figure 14:
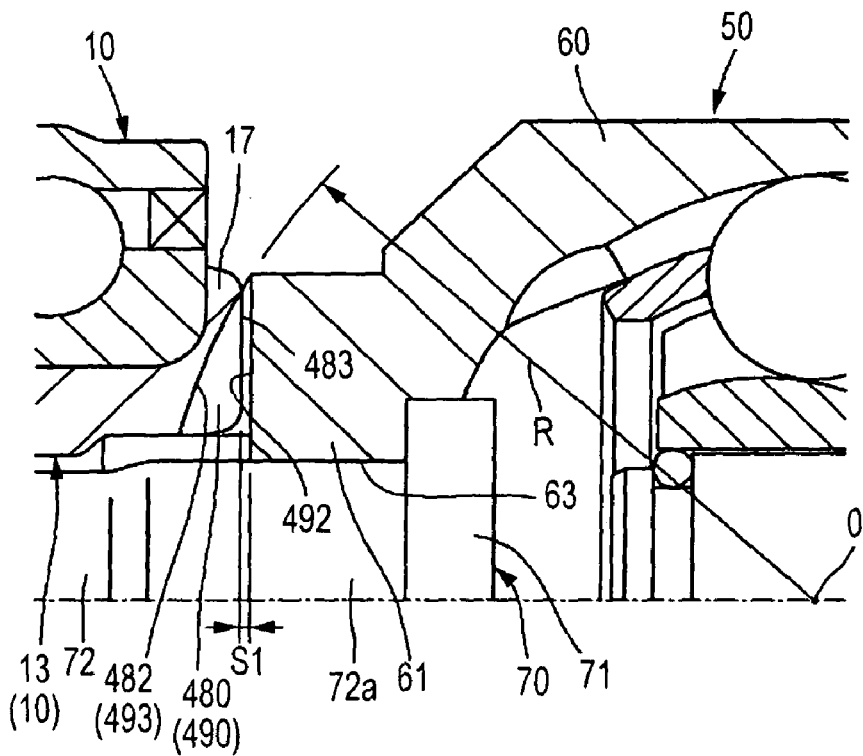
FIG. 14 is an enlarged cross-sectional view showing a condition in which the two side splines are in mesh with each other.

As shown in FIGS. 13 and 14, each tooth top of one of the two side splines 480 and 490, as well as each bottom land of the other side spline, is formed into an arc-shaped surface disposed on a circle having a center disposed on a center of pivotal movement (or swinging movement) of the constant velocity joint 50.

In this fifth embodiment, the tooth top 493 of each spline tooth 491 of the side spline 490 of the constant velocity joint 60, as well as the bottom land 482 of each spline tooth 481 of the side spine 480 of the hub shaft 13, is formed into the arc-shaped surface disposed on the circle which has a radius R and has the center O disposed on the center of pivotal movement of the constant velocity joint 50.

A bottom land 492 of each spline tooth 491 of the side spline 490 of the constant velocity joint 50 is disposed on a plane (vertical plane) perpendicular to a center axis of the outer ring 60 of the constant velocity joint 50, and also a tooth top 483 of each spline tooth 481 of the side spine 480 of the hub shaft 13 is disposed on a plane (vertical plane) perpendicular to a center axis of the hub shaft 13 which is coaxial with the center axis of the outer ring 60.

In the condition in which the hub wheel 10 and the constant velocity joint 50 are connected together by fastening the lock nut 75 to the connecting bolt 70 as shown in FIG. 14, each arc-shaped tooth top 493 contacts the corresponding arc-shaped bottom land 482 so that the hub shaft 13 and the outer ring 60 of the constant velocity joint 50 can be aligned with each other, whereas each bottom land 492 and the corresponding tooth top 483 disposed respectively on the vertical planes are held out of contact with each other, with a clearance S1 formed therebetween.

In the wheel support bearing apparatus of this fifth embodiment having the above construction, when the hub wheel 10 and the constant velocity joint 50 are to be generally unitarily connected together in a torque-transmitting manner, first, the shank 72 of the connecting bolt 70 projecting from the end surface of the end wall portion 61 of the outer ring 60 of the constant velocity joint 50 is inserted into a central hole (or bore) 14 of the hub shaft 13 from one end thereof (that is, the inboard end in the direction of the width of the vehicle) toward the other end thereof (that is, the outboard end in the width of the vehicle).

Then, the male-threaded portion 73 at the distal end portion of the shank 72 of the connecting bolt 70 is projected outwardly from the other end of the central hole 14 such that the side spline 480 on the end surface of the hub shaft 13 is meshed with the side spline 490 on the end surface of the outer ring 60 of the constant velocity joint 50.

In this condition, the lock nut 75 is fastened onto the male-threaded portion 73 of the connecting bolt 70. By thus fastening the lock nut 75 onto the connecting bolt 70, the arc-shaped tooth top 493 of each spline tooth 491 of the side spline 490 contacts the arc-shaped bottom land 482 of the corresponding spline tooth 481 of the side spline 480, so that the hub shaft 13 and the outer ring 60 of the constant velocity joint 50 are aligned with each other.

Finally, part of a thinned end portion 76 of the lock nut 75 is caulked or deformed into the caulking groove 74 in the male-threaded portion 73, thereby preventing the rotation of the lock nut 75, and by doing so, the hub wheel 10 and the constant velocity joint 50 are coupled together in a torque-transmitting manner (see FIG. 12).

As described above, the arc-shaped tooth top 493 of each spline tooth 491 of the side spline 490 contacts the arc-shaped bottom land 482 of the corresponding spline tooth 481 of the side spline 480 so that the hub shaft 13 and the outer ring 60 of the constant velocity joint 50 can be aligned with each other (that is, their center axes can coincide with each other), and therefore vibration and an abnormal sound caused by misalignment can be prevented.

Figure 19:
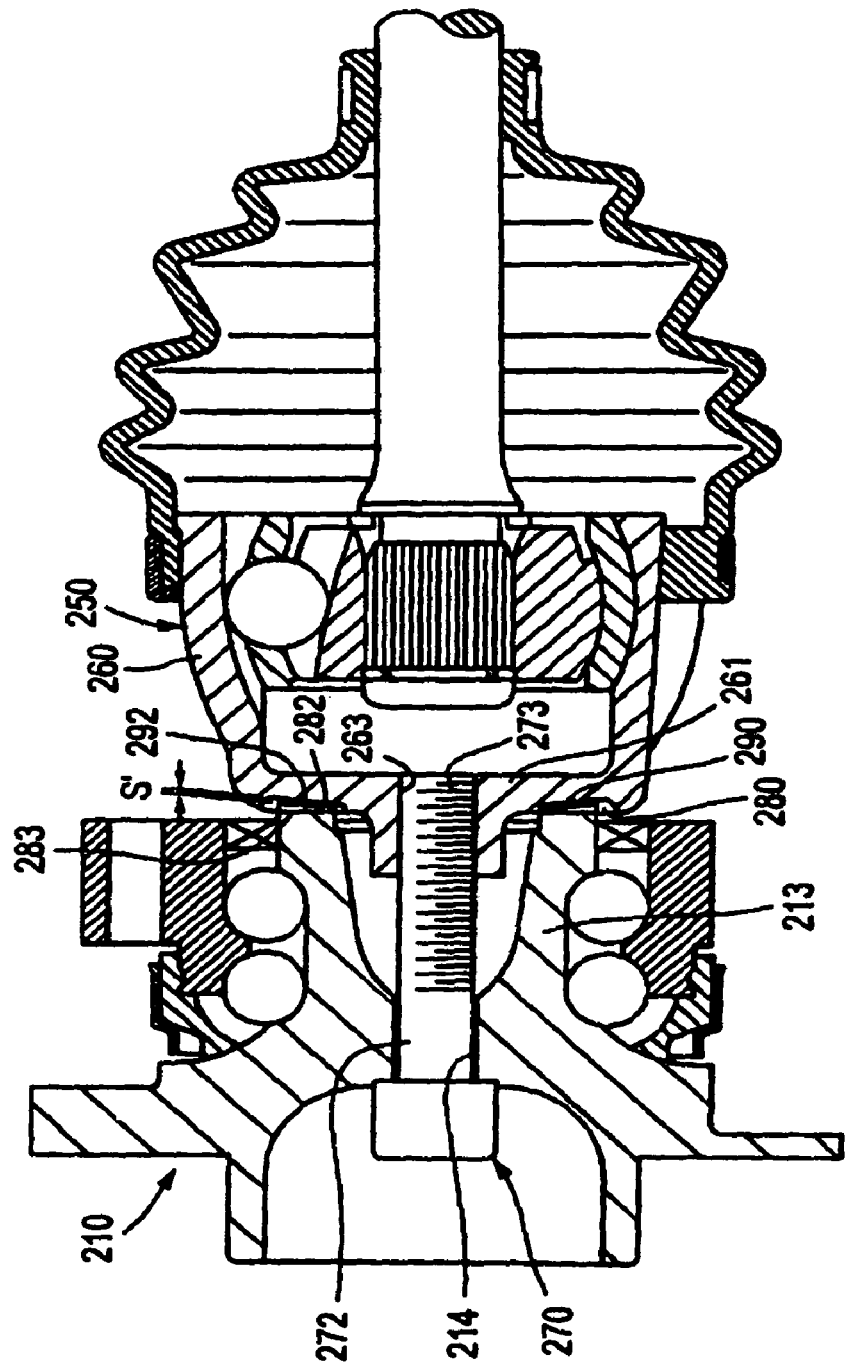
FIG. 19 is a longitudinal cross-sectional view of a another conventional wheel support bearing apparatus.

Furthermore, the tooth top 493 of each spline tooth 491 of the side spline 490 and the bottom land 82 of the corresponding spline tooth 481 of the side spline 480 contact each other at their arc-shaped surfaces, and therefore the area of contact between the meshed side splines is larger as compared with the conventional structure of FIG. 19 in which the mating tooth top and bottom land contact each other at their surfaces parallel to a plane perpendicular to the center axis of the hub shaft. Therefore, the torque-transmitting ability is more excellent.

Furthermore, when a load is exerted so as to incline or pivotally move the center axis of the hub shaft 13 relative to the center axis of the outer ring 60 of the constant velocity joint 50 about the axis of pivotal movement of the constant velocity joint 50 (which coincides with the center O), for example, during the travel of the vehicle, this load can be received by the tooth top (arc-shaped surface) 493 of each relevant spline tooth 491 of the side spline 490 and the bottom land (arc-shaped surface) 482 of the corresponding spline tooth 481 of the side spline 480 in such a manner that this load is distributed over the entire arc-shaped contact surfaces of the relevant tooth tops 493 and bottom lands 482. Therefore, this load is prevented from concentrating on localized portions (outer peripheral portions) of the spline teeth 481 and 491 of the two side splines 480 and 490, and therefore the excellent durability can be obtained.

Furthermore, in this fifth embodiment, the side spline 480 is formed on the end surface of the caulked portion 17 formed by caulking or deforming the end portion of the hub shaft 13 radially outwardly. Therefore, the outer diameter of the side spline 480 formed on this caulked portion 17 can be made larger as compared with the case where such a caulked portion is not formed on the hub shaft 13. Then, the side spline 490 corresponding in outer diameter to the side spline 480 of the hub shaft 13 is formed on the end surface of the end wall portion 61 of the outer ring 60 of the constant velocity joint 50, and is meshed with the side spline 480, and with this construction the torque-transmitting ability can be enhanced.

Sixth Embodiment

Next, a sixth embodiment of the invention will be described with reference to FIGS. 15 and 16.

Figure 15:
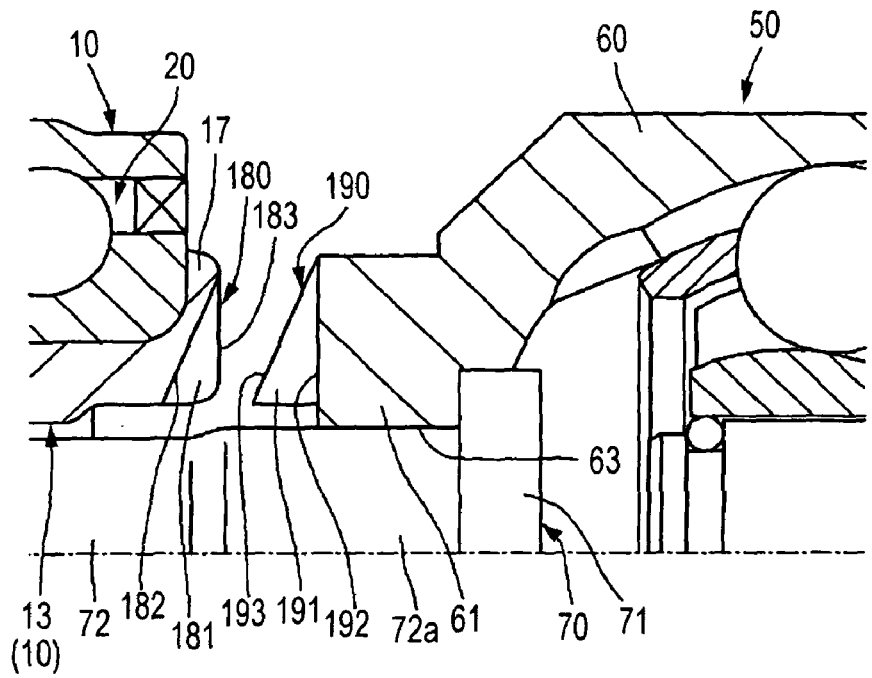
FIG. 15 is an enlarged cross-sectional view showing a condition in which two side splines employed in a wheel support bearing apparatus according to a sixth embodiment of the invention are separated from each other.

FIG. 15 is an enlarged cross-sectional view showing a condition in which two side splines employed in the sixth embodiment of a wheel support bearing apparatus of the invention are separated from each other. FIG. 16 is an enlarged cross-sectional view showing a condition in which the two side splines are in mesh with each other.

Figure 16:
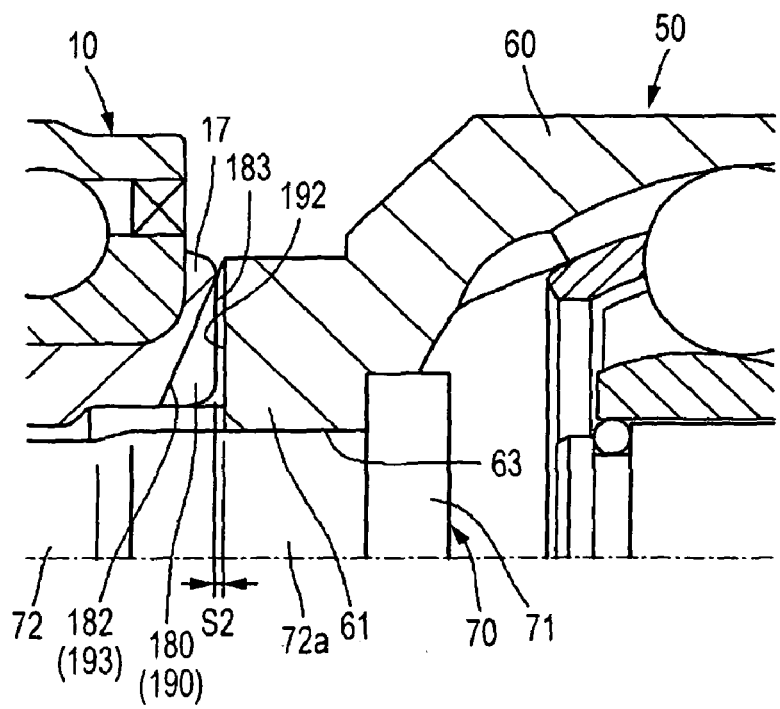
FIG. 16 is an enlarged cross-sectional view showing a condition in which the two side splines are in mesh with each other.
Figure 17:
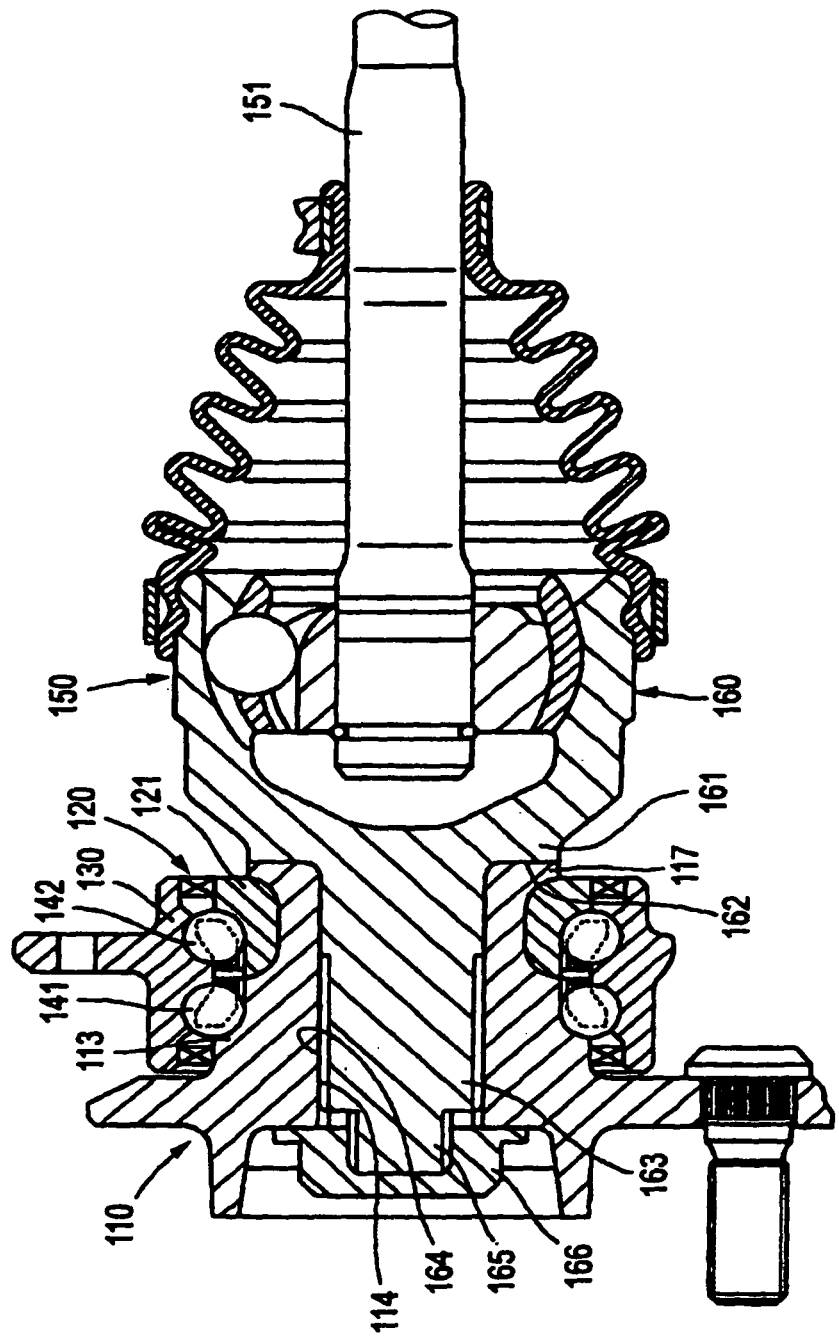
FIG. 17 is a side cross-sectional view of a conventional wheel support apparatus, showing a condition in which a connecting shaft portion of a constant velocity joint is spline-fitted in a bore of a hub shaft of a hub wheel.
Figure 18:
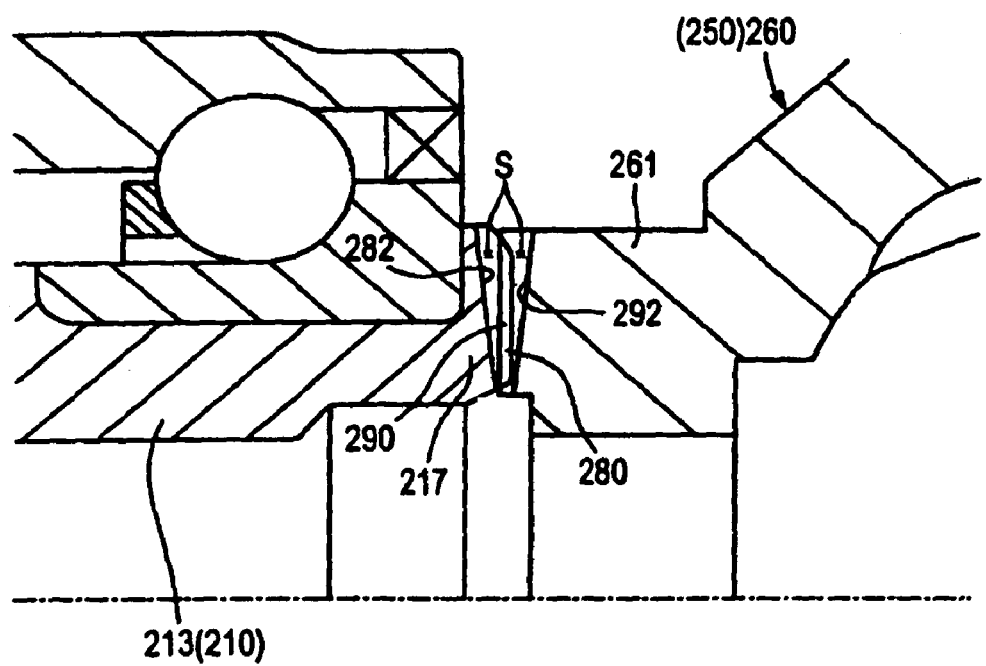
FIG. 18 is a cross-sectional view showing a condition in which a side surface spline on an end surface of an outer ring of a constant velocity joint is meshed with a side surface spline on an end surface of a hub shaft of a hub wheel of a reference example.

As shown in FIGS. 15 and 16, in this sixth embodiment, a side spline 180 is formed on an end surface of a hub shaft 13 (that is, an end surface of a caulked portion 17) of a hub wheel 10, and a side spine 190 is formed on an end surface of an end wall portion 61 of a constant velocity joint 50 which abuts against the end surface of the hub shaft 13. A tooth top 193 of each spline tooth 191 of the side spline 190 of the constant velocity joint 50, as well as a bottom land 182 of each spline tooth 181 of the side spline 180 of the hub shaft 13, is formed into a tapering surface (or inclined surface) inclined relative to a plane perpendicular to a center axis of the hub shaft 13. Further, the tooth top 193 of each spline tooth 191 of the side spline 190 is formed into the tapering surface gradually increasing in height from its radially-outer end to its radially-inner end.

On the other hand, the bottom land 182 of each spline tooth 181 of the side spline 180 is formed into the tapering surface gradually increasing in depth from its radially-outer end to its radially-inner end.

A bottom land 192 of each spine tooth 191 of the side spline 190 of the constant velocity joint 50 is disposed on a plane (vertical plane) perpendicular to a center axis of the outer ring 60 of the constant velocity joint 50, and also a tooth top 183 of each spline tooth 181 of the side spline 180 of the hub shaft 13 is disposed on a plane (vertical plane) perpendicular to the center axis of the hub shaft 13 which is coaxial with the center axis of the outer ring 60.

In a condition in which the hub wheel 10 and the constant velocity joint 50 are connected together by fastening a lock nut (not shown in FIG. 16) to an connecting bolt 70 as shown in FIG. 16, each tapering tooth top 193 contacts the corresponding tapering bottom land 182 so that the hub shaft 13 and the outer ring 60 of the constant velocity joint 50 can be aligned with each other, whereas each bottom land 192 and the corresponding tooth top 183 disposed respectively on the vertical planes are held out of contact with each other, with a clearance S2 formed therebetween.

The other construction of this sixth embodiment is similar to that of the fifth embodiment, and therefore those portions of the second embodiment identical in construction to the corresponding portions of the fifth embodiment are designated by identical reference numerals, respectively, and description thereof is omitted.

Therefore, in the wheel support bearing apparatus of this sixth embodiment, the tapering tooth top 193 of each spline tooth 191 of the side spline 190 contacts the tapering bottom land 182 of the corresponding spline tooth 181 of the side spline 180 so that the hub shaft 13 and the outer ring 60 of the constant velocity joint 50 can be aligned with each other (that is, their center axes can coincide with each other), and therefore vibration and an abnormal sound caused by misalignment can be prevented. Furthermore, the tooth top 193 of each spline tooth 191 of the side spline 190 and the bottom land 182 of the corresponding spline tooth 181 of the side spline 180 contact each other at their tapering surfaces, and therefore the area of contact between the meshed side splines is larger as compared with the conventional structure of FIG. 19 in which the mating tooth top and bottom land contact each other at their surfaces parallel to a plane perpendicular to the center axis of the hub shaft. Therefore, the torque-transmitting ability is more excellent.

In this sixth embodiment, also, the side spline 180 is formed on the end surface of the caulked portion 17 formed by caulking or deforming the end portion of the hub shaft 13 radially outwardly, as described above for the fifth embodiment. Therefore, the outer diameter of the side spline 180 formed on this caulked portion 17 can be made larger as compared with the case where such a caulked portion is not formed on the hub shaft 13. Then, the side spline 190 corresponding in outer diameter to the side spline 180 of the hub shaft 13 is formed on the end surface of the end wall portion 61 of the outer ring 60 of the constant velocity joint 50, and is meshed with the side spline 180, and with this construction the torque-transmitting ability can be enhanced.

The present invention is not limited to the above first to sixth embodiments.

For example, in the above first to sixth embodiments, the connecting bolt 70 separate from the outer ring 60 of the constant velocity joint 50 is press-fitted into the through hole 63 of the end wall portion 61 of the outer ring 60, and is fixed to the outer ring 60. However, an connecting bolt portion may be formed integrally with and extending from the end wall portion 61 of the outer ring 60, and in this case, also, the advantageous effects of the invention can be achieved.

Furthermore, there can be adopted a construction in which an internally-threaded portion is formed in the end wall portion 61 of the outer ring 60 of the constant velocity joint 50, and an connecting bolt is passed through a center hole of the hub shaft from the outboard side in the direction of the width of the vehicle, and an male-threaded portion of this connecting bolt is threaded into the internally-threaded portion in the end wall portion 61 of the outer ring 60 of the constant velocity joint 50. In this case, also, the advantageous effects of the invention can be achieved.

Furthermore, instead of the double row angular contact ball bearing 20 serving as the rolling bearing of the hub wheel, a double row tapered roller bearing can be used, and in this case, also, the advantageous effects of the invention can be achieved.

Furthermore, the above embodiments may be combined each other. For example, the drain passage formed by removing the tooth of the spline according to the embodiment 1 may be formed in the wheel support apparatus according to the third to sixth embodiments.

What is claimed is:
1. A wheel support apparatus comprising:
a hub wheel which includes a hub shaft and is to mount a wheel thereon, a first side surface spline being formed on an end surface of the hub shaft; and
a constant velocity joint which includes an outer ring connected to the hub shaft in a torque-transmitting manner, a second side surface spline meshed with the first side surface spline being formed on an end surface of a side wall portion of the outer ring abutting against the end surface of the hub shaft,
wherein each of the first and second side surface splines includes a number of spline teeth and bottom lands defined between the spline teeth,
wherein tooth tops of the spline teeth of one of the first and second side surface splines and the bottom lands of the other side surface spline are formed into an arc-shaped surface disposed on a circle having a center disposed on a center of pivotal movement of the constant velocity joint, and
wherein the arc-shaped tooth tops contact the corresponding arc-shaped bottom lands so that the hub shaft and the outer ring can be aligned with each other, and
wherein tooth tops of the other side surface spline and the bottom lands of the one of the first and second side surface splines are disposed on planes perpendicular to a center axis of the outer ring.

2. The wheel support apparatus according to claim 1, wherein a gap is provided between the tooth tops and bottom lands disposed on the planes perpendicular to the center axis of the outer ring.

3. A wheel support apparatus comprising:
a hub wheel which includes a hub shaft and is to mount a wheel thereon, a first side surface spline being formed on an end surface of the hub shaft; and
a constant velocity joint which includes an outer ring connected to the hub shaft in a torque-transmitting manner, a second side surface spline meshed with the first side surface spline being formed on an end surface of a side wall portion of the outer ring abutting against the end surface of the hub shaft,
wherein each of the first and second side surface splines includes a number of spline teeth and bottom lands defined between the spline teeth,
wherein tooth tops of the spline teeth of one of the first and second side surface splines and the bottom lands of the other side surface spline are formed into an arc-shaped surface disposed on a circle having a center disposed on a center of pivotal movement of the constant velocity joint,
wherein the arc-shaped tooth tops contact the corresponding arc-shaped bottom lands so that the hub shaft and the outer ring can be aligned with each other, and
wherein an end portion of the hub shaft is caulked radially outwardly to form a caulked portion to which an inner ring of a rolling bearing is fixed, and the first side spline is formed on an end surface of the caulked portion.

4. A wheel support apparatus comprising:
a hub wheel which includes a hub shaft and is to mount a wheel thereon, a first side surface spline being formed on an end surface of the hub shaft; and
a constant velocity joint which includes an outer ring connected to the hub shaft in a torque-transmitting manner, a second side surface spline meshed with the first side surface spline being formed on an end surface of a side wall portion of the outer ring abutting against the end surface of the hub shaft,
wherein each of the first and second side surface splines includes a number of spline teeth and bottom lands defined between the spline teeth,
wherein tooth tops of the spline teeth of one of the first and second side surface splines and the bottom lands of the other side surface spline are formed into an arc-shaped surface disposed on a circle having a center disposed on a center of pivotal movement of the constant velocity joint,
wherein the arc-shaped tooth tops contact the corresponding arc-shaped bottom lands so that the hub shaft and the outer ring can be aligned with each other, and
wherein at least one of the spline teeth of at least one of the first and second side surface splines is removed to form a removal portion which forms a drain passage.

* * * * *